(12) United States Patent
Fujii et al.

(10) Patent No.: US 7,480,235 B2
(45) Date of Patent: Jan. 20, 2009

(54) OFDM TRANSMITTER AND OFDM RECEIVER

(75) Inventors: Hiromasa Fujii, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 619 days.

(21) Appl. No.: 10/984,976

(22) Filed: Nov. 10, 2004

(65) Prior Publication Data
US 2005/0099936 A1 May 12, 2005

(30) Foreign Application Priority Data
Nov. 11, 2003 (JP) ............................. 2003-381708

(51) Int. Cl.
*H04J 11/00* (2006.01)
*H04L 1/00* (2006.01)
(52) U.S. Cl. ...................................... 370/208; 375/348
(58) Field of Classification Search ........................ None
See application file for complete search history.

(56) References Cited

U.S. PATENT DOCUMENTS

| 6,115,354 | A  | * | 9/2000  | Weck .......................... 370/203 |
| 6,449,245 | B1 | * | 9/2002  | Ikeda et al. ................... 370/208 |
| 6,563,896 | B1 | * | 5/2003  | Nomura et al. .............. 375/364 |
| 2003/0165113 | A1 | | 9/2003 | Hudson |
| 2003/0219084 | A1 | * | 11/2003 | Parker ......................... 375/343 |
| 2004/0091057 | A1 | * | 5/2004 | Yoshida ....................... 375/260 |
| 2004/0213145 | A1 | * | 10/2004 | Nakamura .................. 370/208 |

FOREIGN PATENT DOCUMENTS

| CN | 1250991 | 4/2000 |
| EP | 0 895 388 A2 | 2/1999 |
| EP | 0 978 974 A2 | 2/2000 |
| EP | 0 998 068 A1 | 5/2000 |
| EP | 1 014 639 A2 | 6/2000 |
| EP | 1 168 699 A2 | 1/2002 |
| EP | 1 267 536 A1 | 12/2002 |
| EP | 1 418 720 A1 | 5/2004 |
| EP | 1 450 505 A1 | 8/2004 |
| GB | 2 291 314 A | 1/1996 |
| JP | 10-308716 | 11/1998 |

(Continued)

OTHER PUBLICATIONS

Vijaya Chandran Ramasami, "Orthogonal Frequency Division Multiplexing", KUID 698659, Online, XP-002401955, Oct. 31, 2003, pp. 1-29.

(Continued)

*Primary Examiner*—Firmin Backer
*Assistant Examiner*—Clemence Han
(74) *Attorney, Agent, or Firm*—Oblon, Spivak, McClelland, Maier & Neustadt, P.C.

(57) ABSTRACT

An OFDM transmitter transmits an OFDM signal by a frame having a plurality of transmission symbol periods constituted of an effective symbol period for transmitting an information bit and a guard interval. The OFDM transmitter includes a guard interval length decider configured to decide a guard interval length in accordance with a feedback signal from an OFDM receiver; and a guard interval length changer configured to change a guard interval length in each transmission symbol period, in accordance with a decided guard interval length without changing a frame length.

7 Claims, 25 Drawing Sheets

FOREIGN PATENT DOCUMENTS

| | | |
|---|---|---|
| JP | 2001-313622 | 11/2001 |
| JP | 2002-247005 | 8/2002 |
| JP | 2002-290372 | 10/2002 |
| JP | 2002-374223 | 12/2002 |
| WO | WO 97/30531 | 8/1997 |
| WO | WO 02/09383 A1 | 1/2002 |
| WO | 03/047140 | 6/2003 |
| WO | WO 03/047140 A1 | 6/2003 |

OTHER PUBLICATIONS

Residual ISI Cancellation for OFDM with Applications to HDTV Broadcasting, Dukhyun Kim, et al., vol. 16, No. 8, Oct. 1998 p. 1590-1599.

* cited by examiner

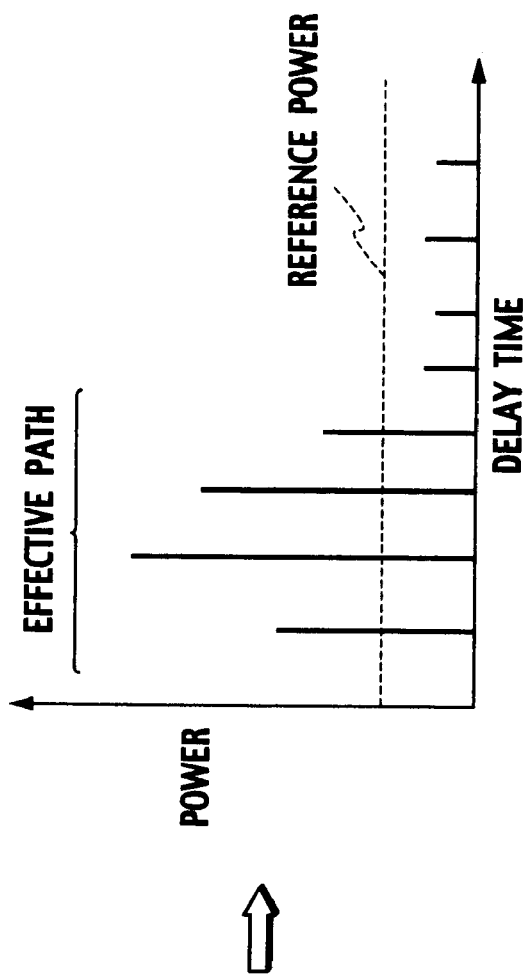
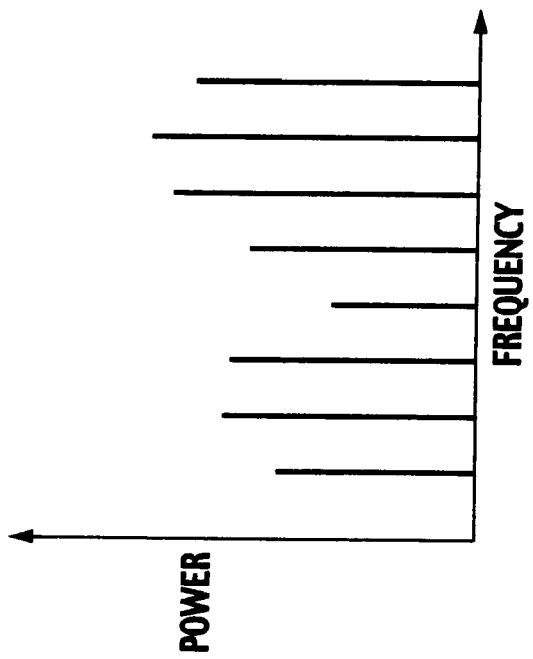

FRAME STRUCTURE BEFORE GUARD INTERVAL EXPANSION

FRAME STRUCTURE AFTER GUARD INTERVAL EXPANSION (TRANSMISSION SYMBOL PERIOD LENGTH IS VARIABLE)

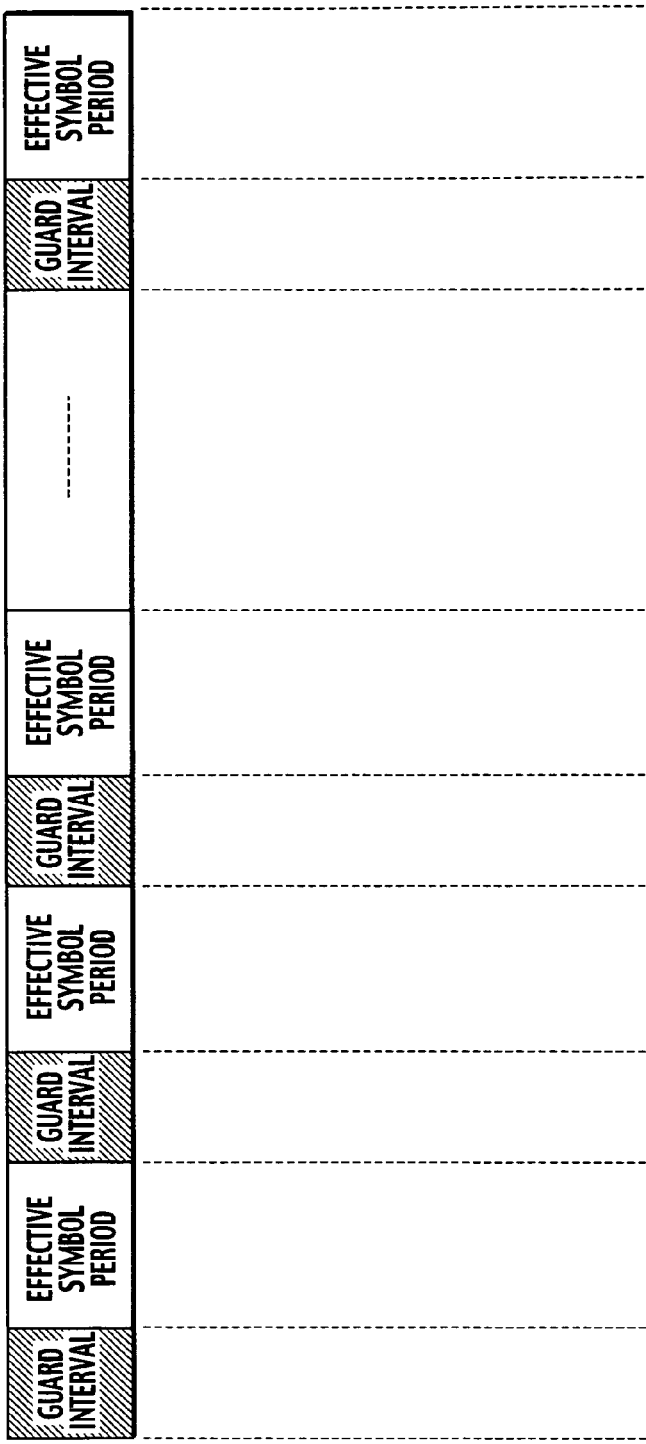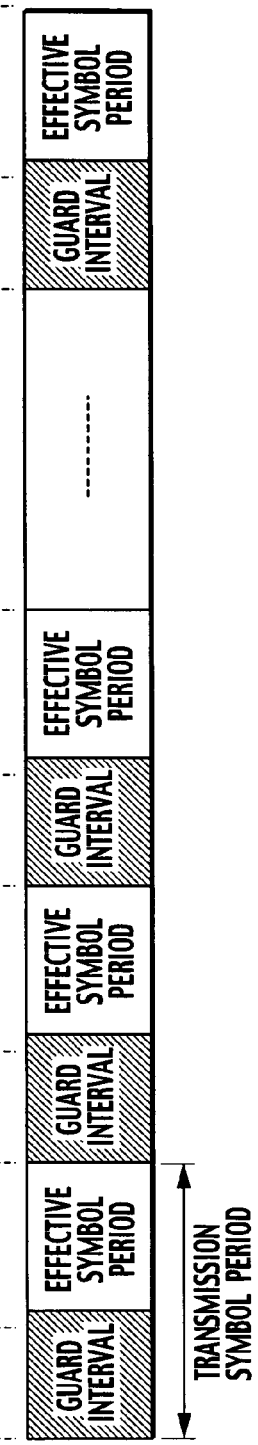
FIG. 17A
FRAME STRUCTURE BEFORE GUARD INTERVAL EXPANSION
FIG. 17B
FRAME STRUCTURE AFTER GUARD INTERVAL EXPANSION (TRANSMISSION SYMBOL PERIOD LENGTH IS FIXED)

OFDM TRANSMITTER AND OFDM RECEIVER

CROSS REFERENCE TO RELATED APPLICATION

This application is based upon and claims the benefit of priority from the prior Japanese Patent Application No. P2003-381708, filed on Nov. 11, 2003; the entire contents of which are incorporated herein by reference.

BACKGROUND OF THE INVENTION

1. Field of the Invention

The present invention relates to an OFDM transmitter which transmits an OFDM signal by a frame having a plurality of transmission symbol periods constituted of effective symbol periods for transmitting information bits and guard intervals, and an OFDM receiver which receives the OFDM signal transmitted by the frame.

2. Description of the Related Art

As a system capable of solving a problem of inter-symbol interference (ISI) in a multi-path environment, an orthogonal frequency division multiplexing (OFDM) system has conventionally been a focus of attention.

FIG. 1 shows a configuration of the conventional OFDM transmitter. As shown in FIG. 1, the conventional OFDM transmitter 1 mainly includes a segment section 101, an encoder section 102, a map section 103, an IFFT (Inverse Fast Fourier Transform) section 104a, and a guard interval addition section 104b. Incidentally, the IFFT section 104a and the guard interval addition section 104b constitute an OFDM signal generation section 104.

The segment section 101 is configured to divide an information bit to be transmitted into segments for radio section transmission, and to output the segments to the encoder section 102.

The encoder section 102 is configured to execute error correction encoding processing for each of the segments divided by the segment section 101, and to output the segments to the map section 103.

The map section 103 is configured to map encoded bits in each segment subjected to the error correction encoding processing by the encoder section 102 to a symbol. For example, when 16 QAM is used as a modulation system, the map section 103 maps four "0, 1" signals to one symbol which corresponds to a point out of 16 points on an IQ plane.

And, the map section 103 is configured to map the symbol in a sub-carrier, and to output the symbol to the IFFT section 104a.

The IFFT section 104a is configured to execute an IFFT processing by using the symbols mapped in a plurality of sub-carriers which have been output from the map section 103, and to output a transmission signal on a time domain.

The guard interval addition section 104b is configured to copy a part of the transmission signal output from the IFFT section 104a, and to add the copy to the transmission signal. Here, a part of the copied transmission signal is a "guard interval".

The transmission signal is transmitted from an antenna of the OFDM transmitter 100 to an OFDM receiver by a frame in which the guard interval is added to an effective symbol period for transmitting the information bit (symbol).

As a result, for example, even in a multi-path environment shown in FIG. 2, i.e., in an environment in which the OFDM receiver receives indirect waves 1 and 2 in addition to a direct wave, by properly setting an FFT (Fast Fourier Transformation) window position, the OFDM receiver can be configured so that a signal component corresponding to the signals in effective symbol periods, or a signal component of the cyclically shifted version of the signals can be contained in the FFT window.

Thus, when the aforementioned OFDM transmitter 100 is used, since each sub-carrier can be considered in a flat fading environment, it is possible to easily carry out channel compensation processing without any inter-symbol interference.

FIG. 3 shows a configuration of the conventional OFDM receiver. As shown in FIG. 3, the conventional OFDM receiver 200 mainly includes a guard interval removal section 201, an FFT section 202, and a data detection section 203.

The guard interval removal section 201 is configured to remove a guard interval of a frame of a received signal.

The FFT section 202 is configured to execute FFT processing by using the received signal whose guard interval has been removed by the guard interval removal section 201 on a set FFT window, and to output a signal on a frequency domain corresponding to each sub-carrier.

The data detection section 203 is configured to execute channel compensation processing, de-mapping processing, and error correction decoding processing for the signal on the frequency domain subjected to the FFT by the FFT section 202, and to detect an information bit.

In the conventional OFDM receiver 200, when all multi-path components are received by delays equal to or less than a guard interval length, the aforementioned effects can be obtained.

However, when a part of the multi-path components is received after a delay which exceeds the guard interval, there is a problem of inter-carrier interference caused by disturbed orthogonality between sub-carriers in addition to inter-symbol interference.

Accordingly, in order to obtain the aforementioned effects, the guard interval must be set sufficiently long in the conventional OFDM receiver 200. However, the long guard interval causes a problem of a reduction in transmission efficiency.

To solve the problem, there has been developed a system for controlling the guard interval length in an adaptive manner.

FIG. 4 shows a configuration of an OFDM receiver which employs such a system. As shown in FIG. 4, the OFDM receiver 200 mainly includes a guard interval removal section 201, an FFT section 202, a data detection section 203, a channel estimation section 204, an impulse response length estimation section 205, a guard interval length updating amount deciding section 206, and a guard interval length memory section 208.

The channel estimation section 204 is configured to estimate a radio channel from the OFDM transmitter to the OFDM receiver, and to calculate a channel estimation value on a frequency domain (FIG. 6A).

The impulse response length estimation section 205 is configured to estimate an impulse response length in accordance with the channel estimation value on the frequency domain calculated by the channel estimation section 204.

As shown in FIG. 5, the impulse response length estimation section 205 includes an IFFT section 205a and an effective path measurement section 205b.

The IFFT section 205a is configured to execute IFFT processing for the channel estimation value on the frequency domain, and to calculate a channel estimation value on a time domain (FIG. 6B).

The effective path measurement section 205b is configured to set a multi-path component having predetermined power, i.e., a multi-path component having power which exceeds reference power, as an effective path, among the channel estimation value on the time domain, and to output the length from first effective path to the last one as an estimated impulse response length.

The guard interval length updating amount deciding section 206 is configured to compare the estimated impulse response length calculated by the impulse response length estimation section 205 with a current guard interval length, and to decide an updating amount of the guard interval length.

The guard interval length updating amount deciding section 206 is configured to notify the decided guard interval length updating amount to the OFDM transmitter through a feedback signal, and to store the updating amount of the guard interval length in the guard interval length memory section 208.

The guard interval removal section 201 is configured to remove the guard interval in accordance with contents stored in the guard interval length memory section 208.

Incidentally, functions of the FFT section 202 and the data detection section 203 are similar to those of the FFT section 202 and the data detection section 203 shown in FIG. 3.

FIG. 7 shows a configuration of an OFDM transmitter which employs the aforementioned system. As shown in FIG. 7, the OFDM transmitter 100 mainly includes a segment section 101, an encoder section 102, a map section 103, an OFDM signal generation section 104, a guard interval point number memory section 105, a guard interval point number deciding section 106, and an in-frame bit number memory section 108.

As shown in FIG. 8, the OFDM signal generation section. 104 includes an IFFT section 104a and a guard interval addition section 104b.

The IFFT section 104a is configured to execute IFFT processing by using symbols mapped in a plurality of sub-carriers output from the map section 103 on a set FFT window, and to output a transmission signal on a time domain.

The guard interval addition section 104b is configured to add a guard interval having the number of guard interval points output from the guard interval point number deciding section 106 to the transmission signal on the time domain output from the IFFT section 104a.

The guard interval point number memory section 105 is configured to store the current number of guard interval points.

The guard interval point number deciding section 106 is configured to decide the number of guard interval points to be set in a transmission symbol period thereafter, in accordance with a feedback signal (updating amount of a guard interval length) from the OFDM receiver 200 and the current number of guard interval points from the guard interval point number memory section 105.

The guard interval point number deciding section 106 is configured to transmit the decided number of guard interval points to the guard interval addition section 104b and the guard interval point number memory section 105.

The in-frame bit number memory section 108 is configured to store a total in-frame bit number of the transmission signal.

The segment 101 is configured to divide an input information bit into predetermined segments in accordance with the total in-frame bit number.

The encoder section 102 is configured to execute predetermined error correction encoding processing for each segment in accordance with the total in-frame bit number.

However, in the conventional OFDM transmitter 100 and the conventional OFDM receiver 200, when the guard interval length is changed in each symbol period, the frame length of the transmission signal is changed. Consequently, when multi-user access is considered in a time division system, there is a problem in that band allocation to users becomes very difficult.

BRIEF SUMMARY OF THE INVENTION

In viewing of the foregoing, it is an object of the present invention to provide an OFDM transmitter and an OFDM receiver which can realize an OFDM system of good reception characteristics in various communication environments in a multi-user environment by changing a guard interval length in each transmission symbol period without changing a frame length of a transmission signal.

A first aspect of the present invention is summarized as an OFDM transmitter which transmits an OFDM signal by a frame having a plurality of transmission symbol periods constituted of an effective symbol period for transmitting an information bit and a guard interval. The OFDM transmitter includes a guard interval length decider configured to decide a guard interval length in accordance with a feedback signal from an OFDM receiver; and a guard interval length changer configured to change a guard interval length in each transmission symbol period, in accordance with a decided guard interval length without changing a frame length.

In the first aspect, the guard interval length changer can include a predetermined time calculator configured to calculate a predetermined period necessary for maintaining the frame length constant, in accordance with a current guard interval length and an in-frame transmission symbol number.

In the first aspect, the guard interval length changer can include a selector configured to select the decided guard interval length having the calculated predetermined period added thereto, in one or a plurality of transmission symbol periods.

In the first aspect, the guard interval length changer can include a selector configured to select one of the decided guard interval length and the decided guard interval length having a predetermined period added thereto, in each transmission symbol period; and a guard interval adder configured to add a guard interval having a selected guard interval length to the effective symbol period, in each transmission symbol period.

In the first aspect, the guard interval length changer can include a guard interval adder configured to add a guard interval having the decided guard interval length to the effective symbol period, in each transmission symbol period; and a predetermined period adder configured to add a predetermined period for fixing a frame length in the frame.

In the first aspect, the guard interval length changer can be configured to change a ratio of the guard interval to the effective symbol period in each transmission symbol period, in accordance with the decided guard interval length.

In the first aspect, the guard interval length changer can include an Inverse Discrete Fourier transformer configured to execute IDFT processing for a symbol to which the information bits are mapped, by using a DFT point number calculated in accordance with the decided guard interval length; and a guard interval adder configured to add the guard interval having the decided guard interval length to the effective symbol period for transmitting the symbol subjected to the IDFT processing.

In the first aspect, the guard interval length decider can be configured to set the guard interval length in the transmission symbol period for transmitting a pilot symbol longer than that in the other transmission symbol period.

A second aspect of the present invention is summarized as an OFDM receiver which receives an OFDM signal transmitted by a frame having a plurality of transmission symbol periods constituted of an effective symbol period for transmitting an information bit and a guard interval. The OFDM receiver includes a determiner configured to determine a guard interval length in each transmission symbol period in the received frame by using a self-correlation of the received OFDM signal.

In the second aspect, the determiner can be configure to determine a peak interval of the self-correlation of the OFDM signal calculated by two transmission symbol period units.

In the second aspect, the determiner can be configured to calculate self-correlations of the OFDM signal delayed by at least two kinds of delay amounts, to select the self-correlation with the largest peak value from among the plurality of calculated self-correlations of the OFDM signal, and to determine the guard interval length in accordance with a delay amount corresponding to the selected self-correlation.

In the second aspect, the determiner can be configured to determine the guard interval length in accordance with a peak number of the self-correlation of the OFDM signals calculated by one frame unit.

In the second aspect, the determiner can be configured to determine a period in which a moving average of the self-correlation of the OFDM signal is equal to or higher than a predetermined threshold value, as the guard interval length, in one transmission symbol period.

BRIEF DESCRIPTION OF THE SEVERAL VIEWS OF THE DRAWINGS

FIGS. 6A and 6B are diagrams illustrating an operation of the impulse response length estimation section of the OFDM receiver according to the prior art 2;

FIGS. 17A and 17B are diagrams showing frame structures of transmission signals transmitted from the OFDM transmitter of the second embodiment of the invention;

DETAILED DESCRIPTION OF THE INVENTION

First Embodiment

Figure 9:
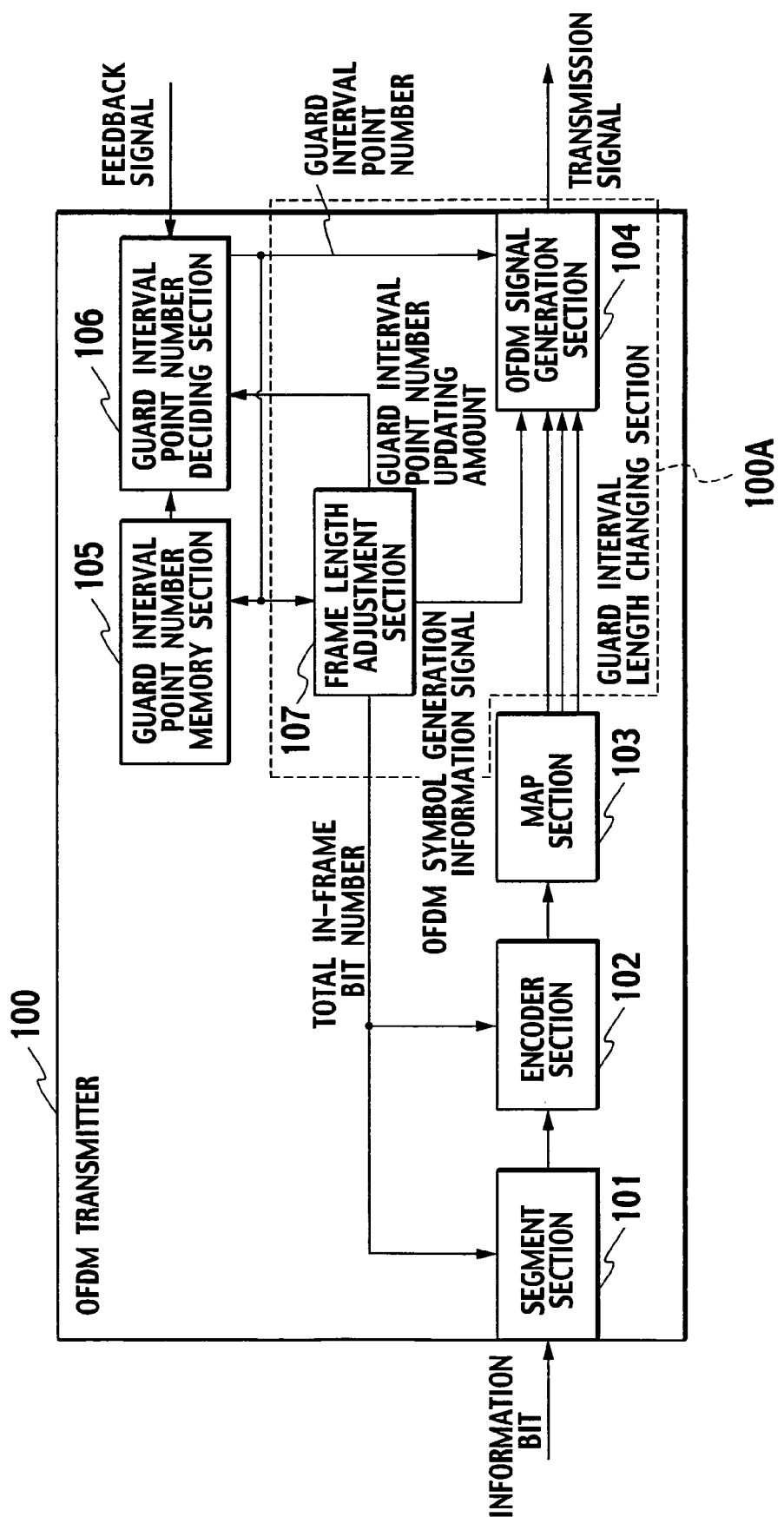
FIG. 9 is a functional block diagram of an OFDM transmitter according to a first embodiment of the present invention.

Hereinafter, description is made of an OFDM transmitter according to a first embodiment of the present invention, with reference to the accompanying drawings. FIG. 9 is a functional block diagram of an OFDM transmitter 100 of the embodiment.

As shown in FIG. 9, the OFDM transmitter 100 of the embodiment mainly includes a segment section 101, an encoder section 102, a map section 103, an OFDM signal generation section 104, a guard interval point number memory section 105, a guard interval point number deciding section 106, and a frame length adjustment section 107.

The guard interval length changing section 100A is configured by the OFDM signal generation section 104 and the frame length adjustment section 107.

Figure 1:
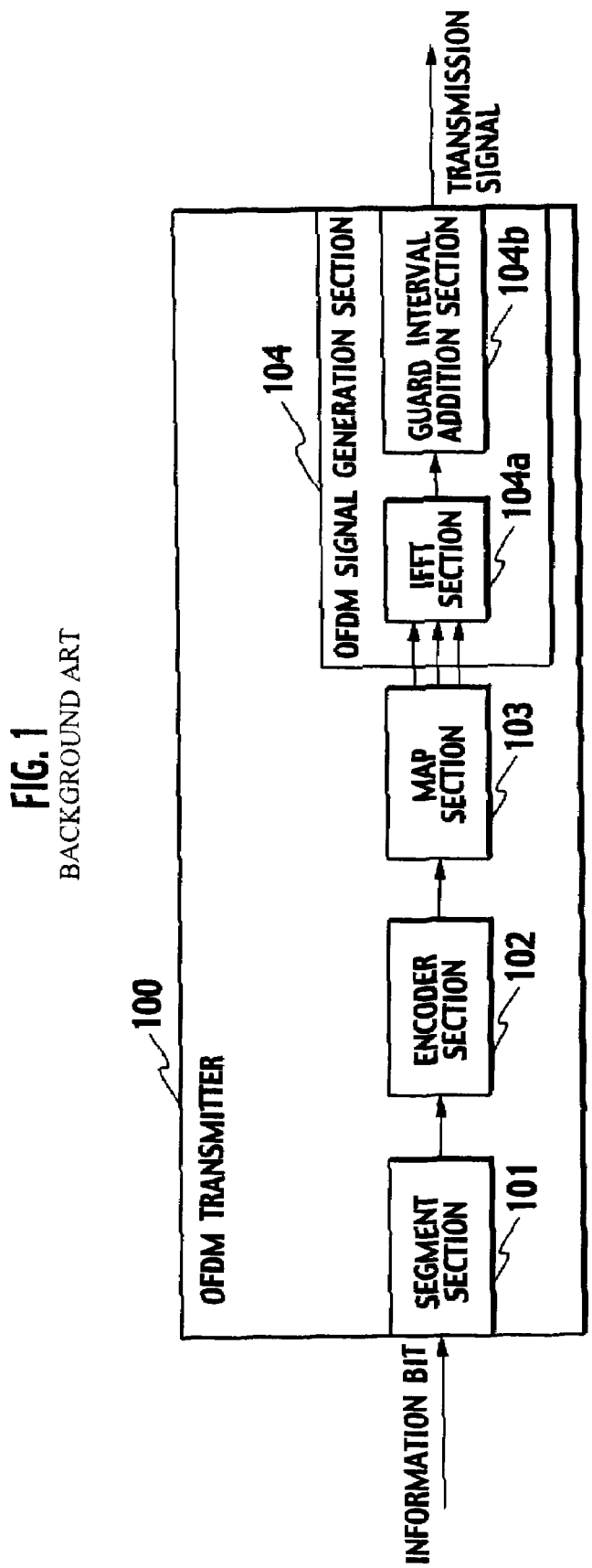
FIG. 1 is a functional block diagram of an OFDM transmitter according to a prior art 1.
Figure 2:
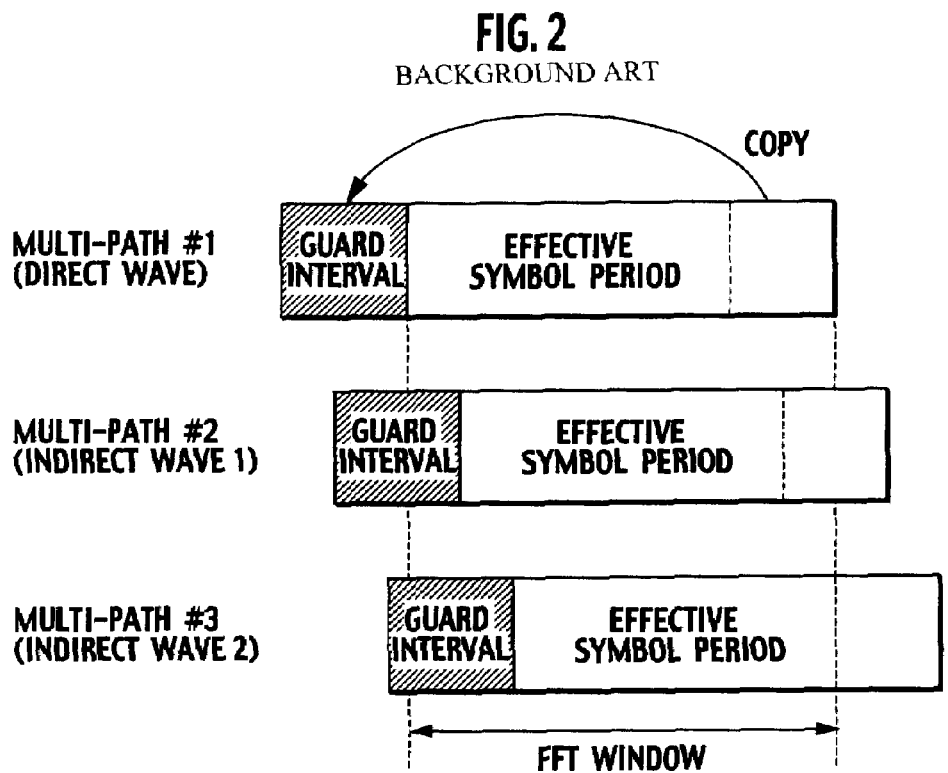
FIG. 2 is a diagram showing a signal received through a multi-path propagation link on an OFDM receiver of the prior art 1.
Figure 3:
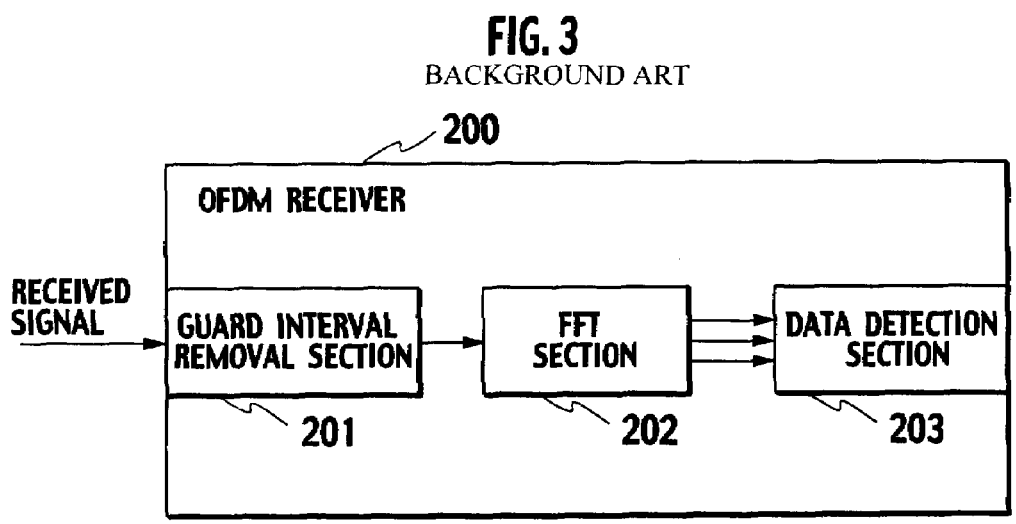
FIG. 3 is a functional block diagram of the OFDM receiver according to the prior art 1.

Functions of the segment section 101, the encoder section 102 and the map section 103 are similar to those of the sections of the conventional OFDM transmitter 100 as shown in FIG. 1.

The frame length adjustment section 107 is configured to calculate a guard interval point updating amount, an OFDM symbol generation information signal, and a total in-frame bit number, based on the current number of guard interval points, in accordance with an instruction from the guard interval point number deciding section 106.

Here, the instruction from the guard interval point number deciding section 106 is one of an instruction of lengthening a guard interval and an instruction of shortening the guard interval.

The frame length adjustment section 107 is configured to output the guard interval point updating amount to the guard interval point number deciding section 106, to output the OFDM symbol generation information signal to the OFDM signal generation section 104, and to output the total in-frame bit number to the segment section 101 and the encoder section 102.

Figure 10:
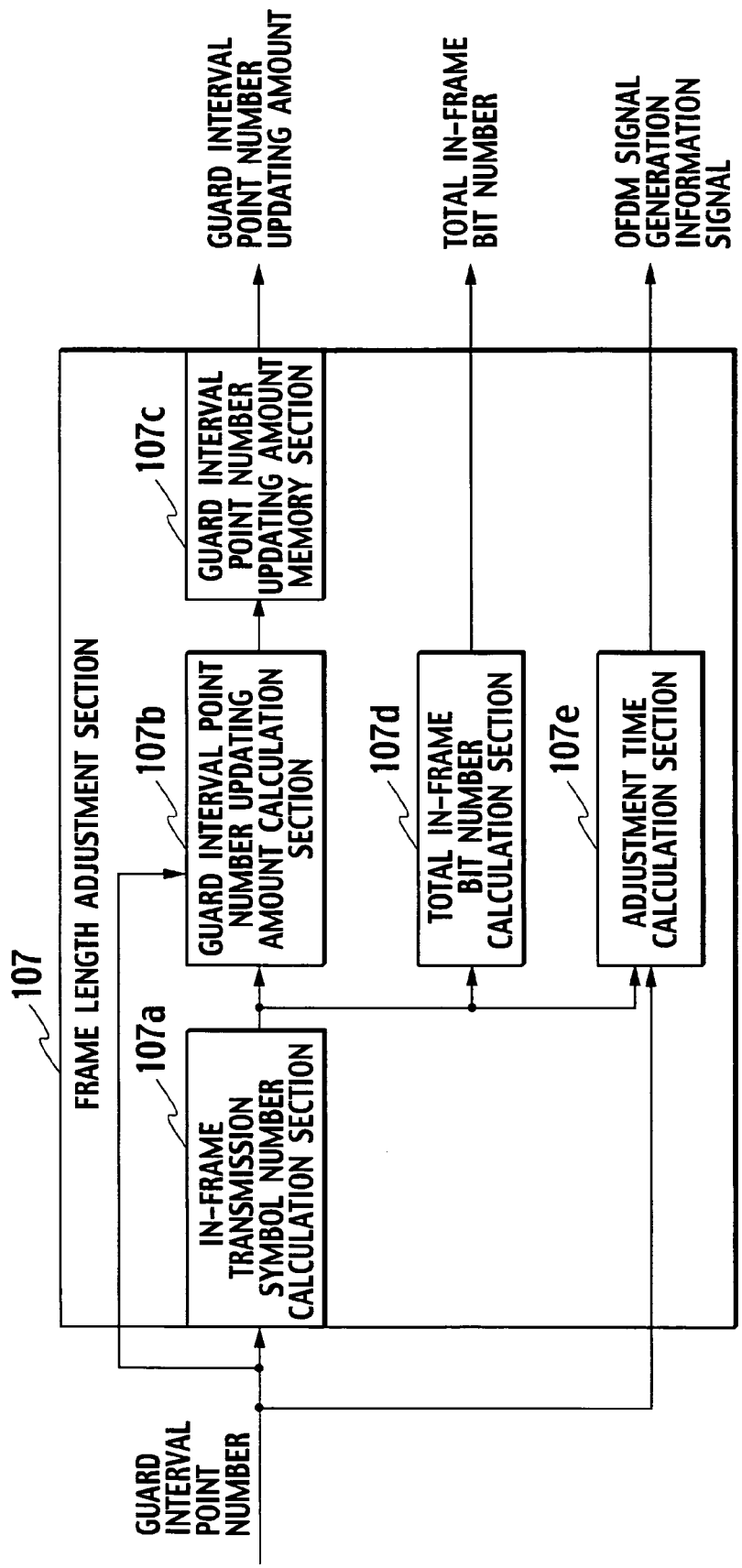
FIG. 10 is a functional block diagram of a frame length adjustment section of the OFDM transmitter according to the first embodiment of the invention.

Specifically, as shown in FIG. 10, the frame length adjustment section 107 includes an in-frame transmission symbol number calculation section 107a, a guard interval point number updating amount calculation section 107b, a guard interval point number updating amount memory section 107c, a total in-frame bit number calculation section 107d, and an adjustment time calculation section 107e.

The in-frame transmission symbol number calculation section 107a is configured to apply the current number of guard interval points to an equation 1, so as to calculate the number of in-frame transmission symbols.

(In-frame transmission symbol number)=(total in-frame point number)/{(guard interval point number)+(FFT point number)} <Equation 1>

In this case, the number of guard interval points indicates the number of discrete complex signals in the guard interval of each transmission period, and the number of FFT points indicates the number of discrete complex signals in an effective symbol period in which an information bit of each transmission symbol period can be inserted. Additionally, the total number of in-frame points indicates the total number of discrete complex signals in the frame.

The guard interval point number updating amount calculation section 107b is configured to calculate a guard interval point number updating amount by applying the current number of guard interval points and the in-frame transmission symbol number from the in-frame transmission symbol number calculation section 107a to an equation 2 in the case of lengthening the guard interval, and by applying them to an equation 3 in the case of shortening the guard interval.

(Guard interval point number updating amount)=floor [(total in-frame point number)/{(in-frame transmission symbol number)−1}]−(FFT point number)−(current guard interval point number) <Equation 2>

(Guard interval point number updating amount)=−1× (floor [(total in-frame point number)/{(in-frame transmission symbol number)+1}]−(FFT point number))+(current guard interval point number) <Equation 3>

The guard interval point number updating amount calculation section 107b may be configured to store results of pre-executing calculations of the equations 2 and 3 in the guard interval point number updating amount memory section 107c, and to select and provide a proper guard interval point number updating amount in accordance with an instruction from the guard interval point number deciding section 106.

The guard interval point number updating amount calculation section 107b is configured to set a guard interval point number updating amount to "0" in the case of lengthening the guard interval length, when the number of guard interval points is equal to a prescribed maximum value.

And, the guard interval point number updating amount calculation section 107b is configured to set a guard interval point number updating amount to "0" in the case of shortening the guard interval length, when the number of guard interval points is equal to a prescribed minimum value.

The total in-frame bit number calculation section 107d is configured to calculate a total in-frame bit number by using an equation 4, in accordance with the in-frame transmission symbol number from the in-frame transmission symbol number calculation section 107a.

(Total in-frame bit number)=(in-frame transmission symbol number)×(sub-carrier number)×(correction term) <Equation 4>

Here, the correction term is for considering an encoding rate, a modulation multi-value number, or the like.

The total in-frame bit number is input to the segment section 101 and the encoder section 102.

The segment section 101 is configured to segment the input information bit in accordance with the input total in-frame bit number.

The adjustment time calculation section 107e is configured to calculate an adjustment time (predetermined period) necessary for maintaining the frame length constant by applying the current number of guard interval points and the in-frame transmission number from the in-frame transmission symbol number calculation section 107a to an equation 5.

(Adjustment time)=(total in-frame point number)−(in-frame symbol number)×{(FFT point number)+(guard interval point number)} <Equation 5>

The adjustment time calculation section 107e is configured to output an OFDM signal generation information signal which contains the calculated adjustment time, to the OFDM signal generation section 104.

The OFDM signal generation section 104 is configured to generate an OFDM signal (transmission signal) transmitted through a frame having a plurality of transmission symbol periods, in accordance with the symbols mapped in the sub-carriers from the map section 103, the guard interval point number from the guard interval point number deciding section 106, and the OFDM signal generation information signal from the frame length adjustment section 107.

That is, the OFDM signal generation section 104 is configured to change the guard interval length in each transmission symbol period, in accordance with the guard interval length decided by the guard interval point number deciding section 106 without changing the frame length of the OFDM signal.

Figure 11:
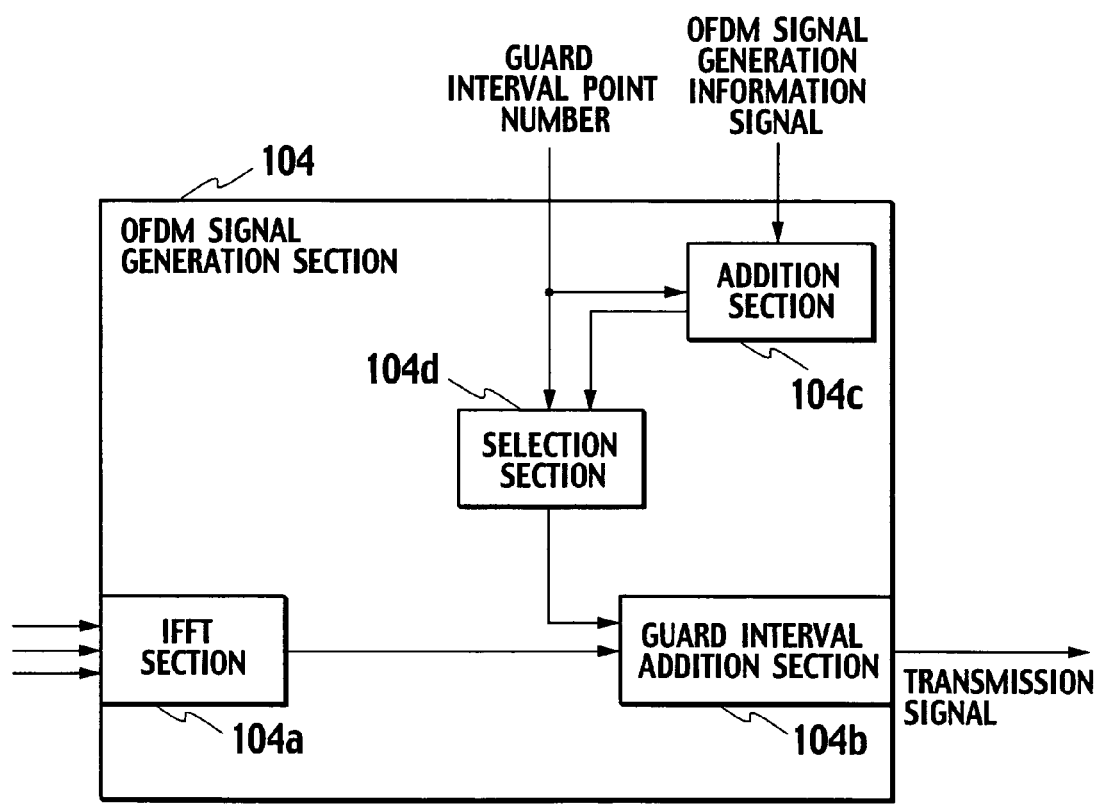
FIG. 11 is a functional block diagram of an OFDM signal generation section of the OFDM transmitter according to the first embodiment of the invention.

Specifically, as shown in FIG. 11, the OFDM signal generation section 104 includes an IFFT section 104a, a guard interval addition section 104b, an addition section 104c, and a selection section 104d.

The IFFT section 104a is configured to execute the IFFT processing by using the symbols mapped in the plurality of sub-carriers output from the map section 103, and to output the transmission signal on the time domain to the guard interval addition section 104b.

The addition section 104c is configured to add the number of points (discrete complex signal number) corresponding to the adjustment time contained in the OFDM signal generation information signal from the frame length adjustment section 107, to the guard interval point number from the guard interval point number deciding section 106, in each transmission symbol period.

The selection section 104d is configured to select one of the guard interval point number from the guard interval point number deciding section 106 and the guard interval point number (guard interval point number to which the number of points corresponding to the adjustment time is added) output from the addition section 104*c*, in each transmission symbol period.

The selection section 104*d* may be configured to select the guard interval point number output from the addition section 104*c* in one transmission symbol period in each frame, or to select the guard interval point number output from the addition section 104*c* in a plurality of transmission symbol periods in each frame.

Additionally, the selection section 104*d* may be configured to carry out the aforementioned selection processing, in accordance with an instruction from the guard interval point number deciding section 106.

The guard interval addition section 104*b* is configured to add a guard interval having a guard interval length corresponding to the guard interval point number output from the selection section 104*d*, to an effective symbol period in each transmission symbol period constituting the transmission signal on the time domain from the IFFT section 104*a*.

The guard interval point number memory section 105 is configured to store the current guard interval point number decided by the guard interval point number deciding section 106.

The guard interval point number memory section 105 can provide the current guard interval point number stored for the guard interval point number deciding section 106 in response to a request.

The guard interval point number deciding section 106 is configured to decide a guard interval length (guard interval point number) in each transmission symbol period based on the current guard interval point number from the guard interval point number memory section 105 and the guard interval point updating amount from the frame length adjustment section 107, in accordance with a feedback signal from the OFDM receiver 200.

Incidentally, the feedback signal is periodically transmitted from the OFDM receiver 200, and contains an instruction of "lengthening", "shortening" or "maintaining" the guard interval length.

The guard interval point number deciding section 106 is configured to output the decided guard interval point number to the OFDM signal generation section 104, the guard interval point number memory section 105, and the frame length adjustment section 107.

Incidentally, the guard interval point number deciding section 106 may be configured to decide a guard interval point number for each frame, or to decide a guard interval point number for each transmission symbol period.

Figure 12:
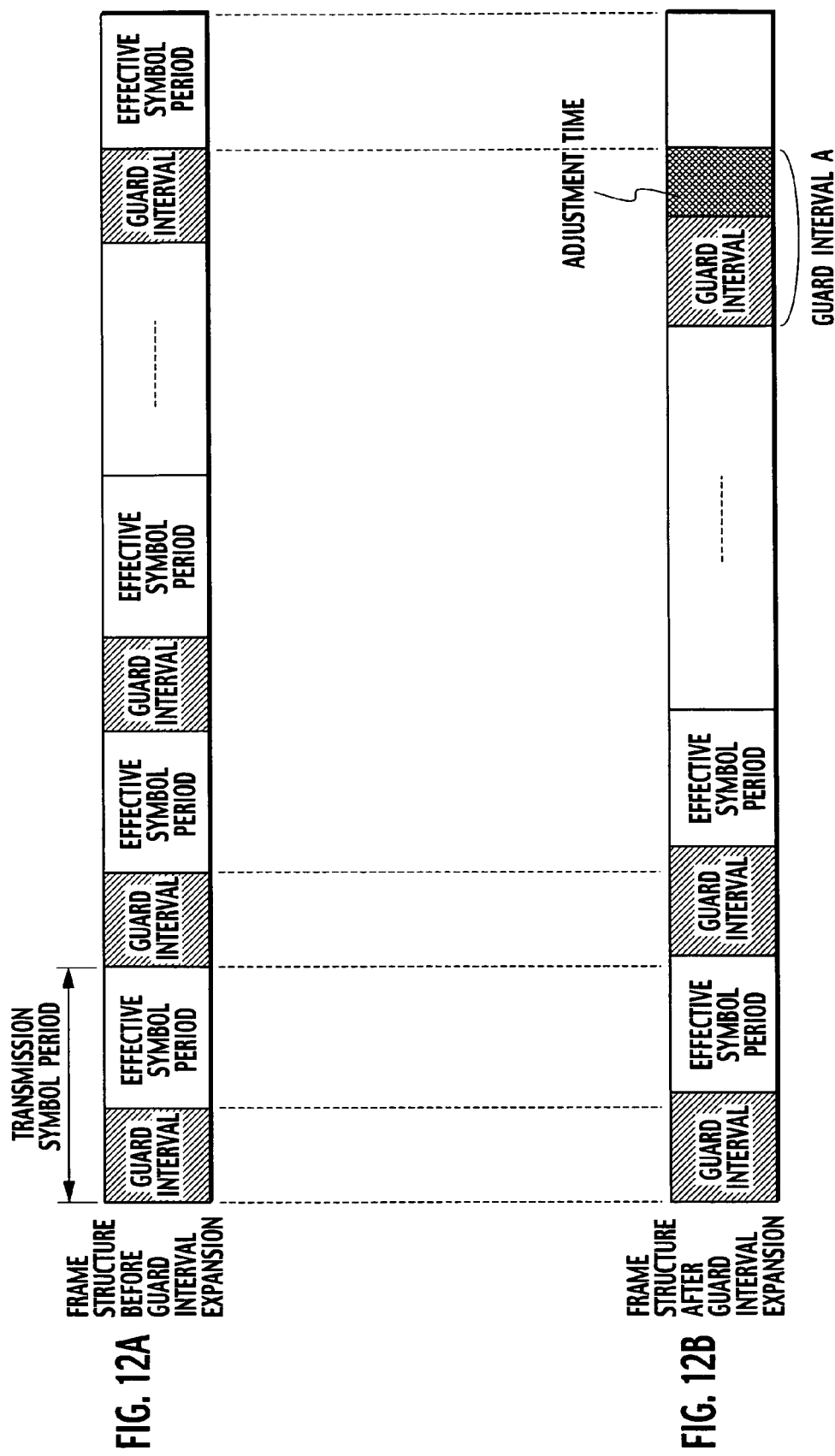
FIGS. 12A and 12B are diagrams showing frame structures of transmission signals transmitted from the OFDM transmitter of the first embodiment of the invention.

FIG. 12A shows a frame structure before the guard interval length is expanded by the OFDM transmitter 100 of the embodiment. FIG. 12B shows a frame structure after the guard interval length is expanded by the OFDM transmitter 100 of the embodiment.

As apparent from FIGS. 12A and 12B, according to the OFDM transmitter 100 of the embodiment, while each transmission symbol period length is changed, by expanding a specific guard interval "A" by a predetermined period (adjustment time) only, so as not to disturb the transmission start timing of the frame of the transmission signal, it is possible to change the guard interval length in each transmission symbol period without changing the frame length of the transmission signal.

MODIFIED EXAMPLE 1

Figure 13:
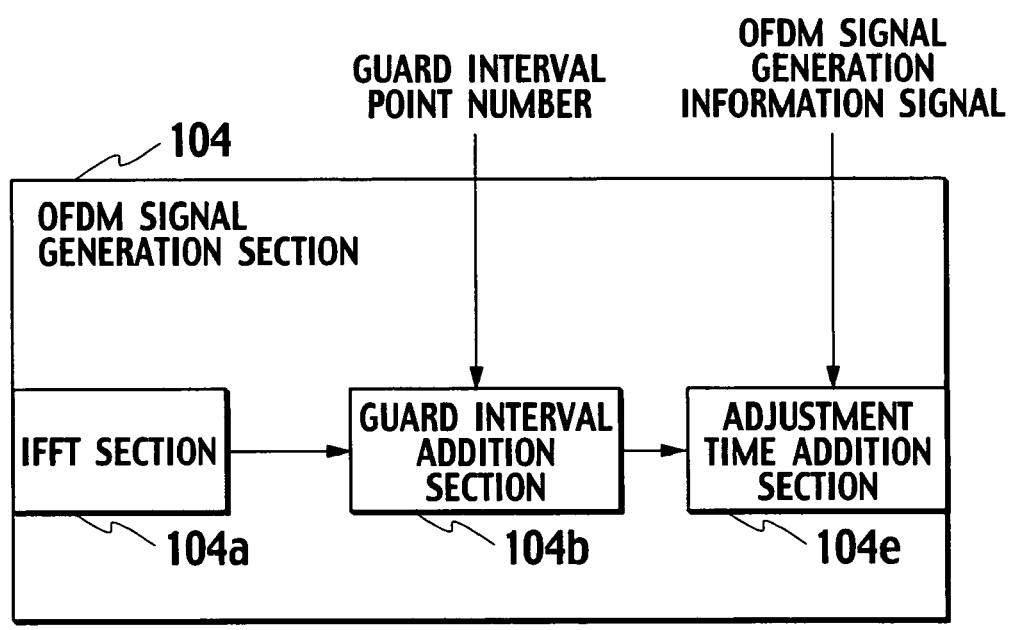
FIG. 13 is a functional block diagram of an OFDM signal generation section of an OFDM transmitter according to a modified example 1 of the invention.
Figure 14A:
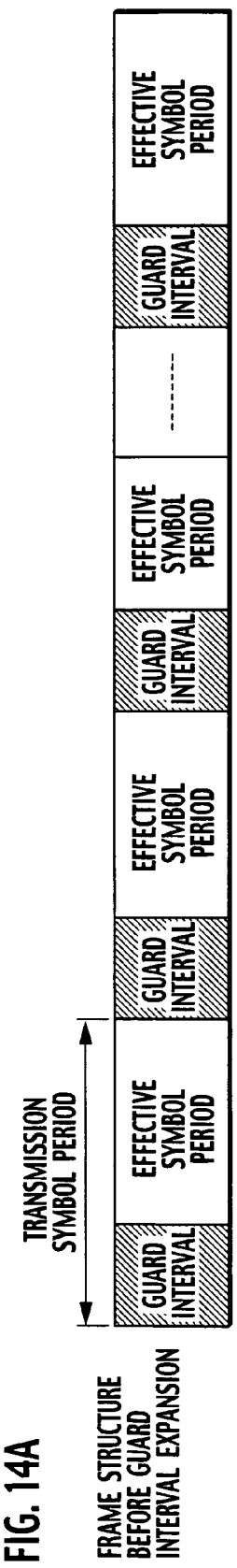
FIGS. 14A and 14B are diagrams showing frame structures of transmission signals transmitted from the OFDM transmitter of the modified example 1 of the invention.
Figure 14B:
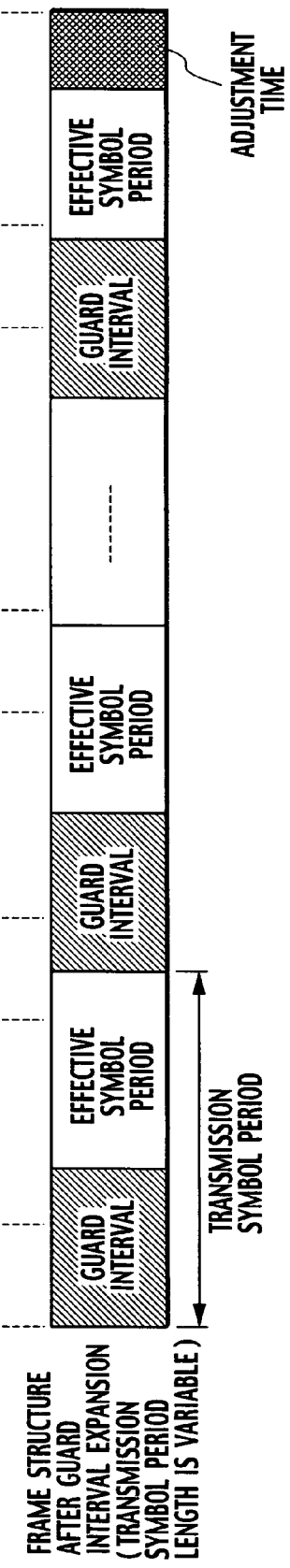

Referring to FIG. 13 and FIGS. 14A and 14B, description is made of a modified example 1 of the OFDM transmitter 100 of the first embodiment. Hereinafter, differences of the OFDM transmitter 100 of the modified example 1 from that of the first embodiment is mainly be described.

As shown in FIG. 13, an OFDM signal generation section 104 of the OFDM transmitter 100 of the modified example 1 includes an IFFT section 104*a*, a guard interval addition section 104*b*, and an adjustment time addition section 104*e*.

The guard interval addition section 104*b* of the modified example 1 is configured to add a guard interval having a guard interval length corresponding to a guard interval point number decided by a guard interval point number deciding section 106, to an effective symbol period in each transmission symbol period constituting a transmission signal on a time domain from the IFFT section 104*a*, in each transmission symbol period.

The adjustment time addition section 104*e* is configured to insert an adjustment time contained in an OFDM signal generation information signal from a frame length adjustment section 107 in a frame.

In this case, the adjustment time is a predetermined time for fixing a frame length of the frame of the transmission signal, and a period during which no transmission signals are transmitted.

The adjustment time addition section 104*e* may insert the adjustment time into a head or a tail of the frame, or a specific position in the frame.

As apparent from FIGS. 14A and 14B, according to the OFDM transmitter 100 of the modified example 1, while each transmission symbol period length is changed, by inserting the predetermined time (adjustment time) into the tail of the frame, so as not to disturb a transmission start timing of the frame of the transmission signal, it is possible to change the guard interval length in each transmission symbol period without changing the frame length of the transmission signal.

Second Embodiment

Referring to FIGS. 15 to 16, and FIGS. 17A and 17B, description is made of an OFDM transmitter 100 according to a second embodiment of the invention. Hereinafter, differences of the OFDM transmitter 100 of the embodiment from that of the first embodiment is mainly be described.

Figure 15:
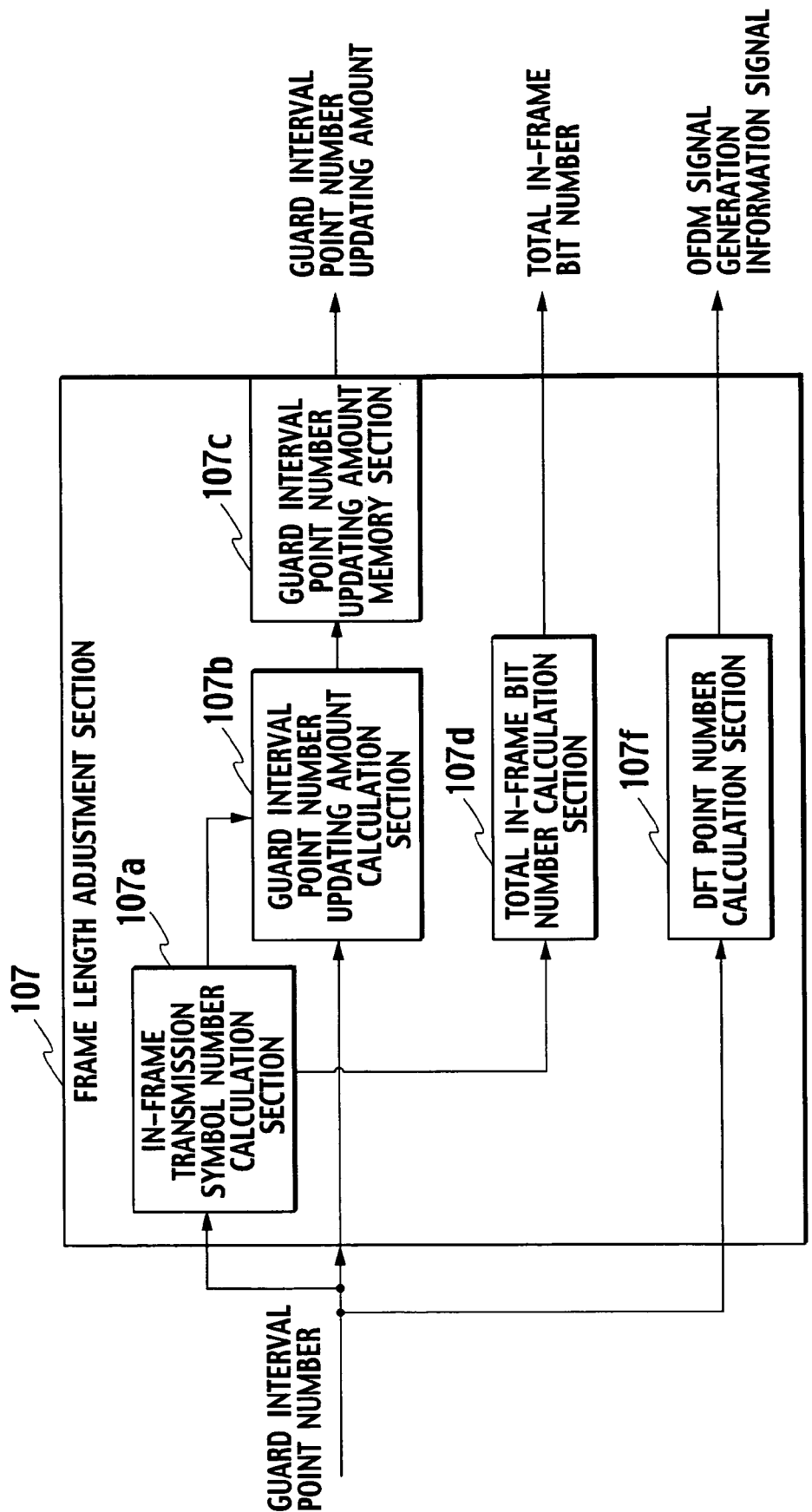
FIG. 15 is a functional block diagram of a frame length adjustment section of an OFDM transmitter according to a second embodiment of the present invention.

As shown in FIG. 15, a frame length adjustment section 107 of the OFDM transmitter of the second embodiment includes an in-frame transmission symbol number calculation section 107*a*, a guard interval point number updating amount calculation section 107*b*, a guard interval point number updating amount memory section 107*c*, a total in-frame bit number calculation section 107*d*, and a DFT point number calculation section 107*f*.

The guard interval point number updating amount calculation section 107*b* is configured to calculate a guard interval point number updating amount based on a current guard interval point number in accordance with an instruction from a guard interval point number deciding section 106.

For example, the guard interval point number updating amount calculation section 107*b* is configured to select a prescribed guard interval point number updating amount in accordance with an instruction from the guard interval point number deciding section 106.

The guard interval point number updating amount calculation section 107b is configured to set a guard interval point number updating amount to "0" in the case of lengthening a guard interval length, when the number of guard interval points is equal to a prescribed maximum value.

And, the guard interval point number updating amount calculation section 107b is configured to set a guard interval point number updating amount to "0" in the case of shortening the guard interval length, when the number of guard interval points is equal to a prescribed minimum value.

The guard interval point number updating amount calculation section 107b is configured to output the calculated guard interval point number updating amount to the guard interval point number updating amount memory section 107c and the DFT point number calculation section 107f.

The DFT point number calculation section 107f is configured to subtract the current guard interval point number from the prescribed transmission symbol period point number, to calculate a DFT (Discrete Fourier Transformation) point number, to contain the DFT point number in an OFDM signal generation information signal, and to output the OFDM signal generation information signal.

Figure 16:
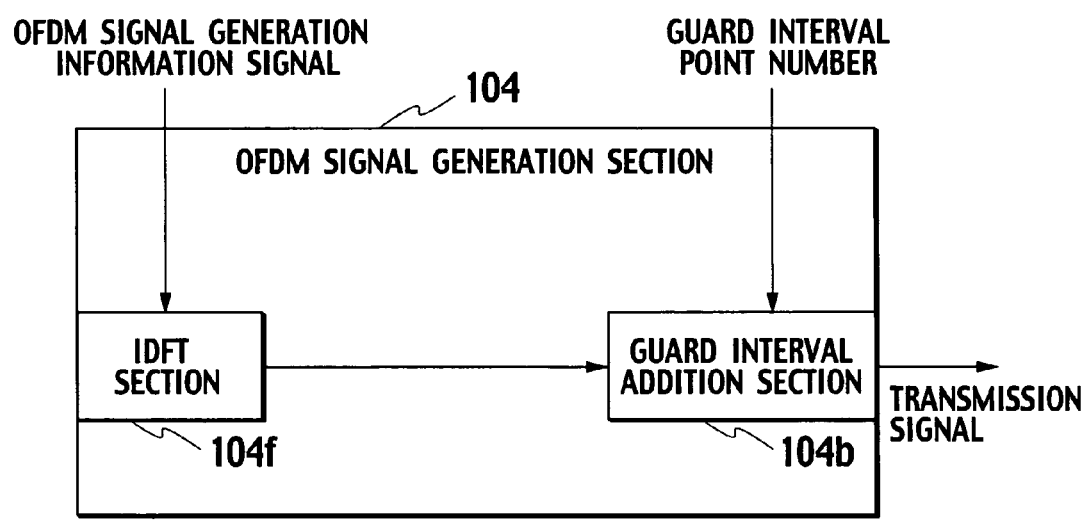
FIG. 16 is a functional block diagram of an OFDM signal generation section of the OFDM transmitter according to the second embodiment of the invention.

As shown in FIG. 16, the OFDM signal generation section 104 of the OFDM transmitter 100 of the second embodiment includes an IDFT section 104f and a guard interval addition section 104b.

The IDFT section 104f is configured to execute IDFT (Inverse Discrete Fourier Transformation) processing for symbols (information bits) mapped in a plurality of sub-carriers output from a map section 103, in accordance with the DFT point number contained in the OFDM signal generation information signal from the frame length adjustment section 107, and to output a transmission signal on a time domain to the guard interval addition section 104b.

The guard interval addition section 104b is configured to add a guard interval having a guard interval length corresponding to the guard interval point number from the guard interval point number deciding section 106, to an effective symbol period (transmission signal on the time domain) for transmitting the information bits subjected to the IDFT processing.

As a result, based on the guard interval length decided by the guard interval point number deciding section 106, the OFDM signal generation section 104 can change a ratio of the guard interval to the effective symbol period in each transmission symbol period without changing the frame length of the transmission signal.

The OFDM signal generation section 104 may be configured to change the ratio of the guard interval to the effective symbol period in the same frame for each transmission period.

As apparent from FIGS. 17A and 17B, according to the OFDM transmitter 100 of the second embodiment, since the ratio of the guard interval to the effective transmission symbol in each transmission symbol period is changed without changing each transmission symbol period length, it is possible to change the guard interval length in each transmission symbol period without changing the frame length of the transmission signal.

According to the OFDM transmitter 100 of the second embodiment, since no period for transmitting no transmission symbols in the frame is generated, transmission efficiency can be increased.

Third Embodiment

Next, description is made of an OFDM transmitter 100 according to a third embodiment of the invention. As described above in the prior art, in the conventional OFDM transmitter 100, in order to properly select a guard interval, it is necessary to accurately estimate a channel impulse response length.

However, upon an influence of inter-symbol interference in a transmission period containing a pilot symbol, in the OFDM transmitter 100, there is a possibility that a guard interval will not be properly selected.

Accordingly, a guard interval point number deciding section 106 of the OFDM transmitter 100 of the third embodiment is configured to set a guard interval length in a transmission symbol period for transmitting the pilot symbol longer than that in the other transmission symbol period.

According to the OFDM transmitter 100 of the third embodiment, by setting the long guard interval length in the transmission symbol period containing the pilot symbol which plays an important role in channel estimation in an OFDM receiver 200, it is possible to improve receiving characteristics in the transmission symbol period containing the pilot symbol.

Fourth Embodiment

Referring to FIGS. 18 and 19, and FIGS. 20A to 20C, description is made of an OFDM receiver 200 according to a fourth embodiment of the invention.

Figure 4:
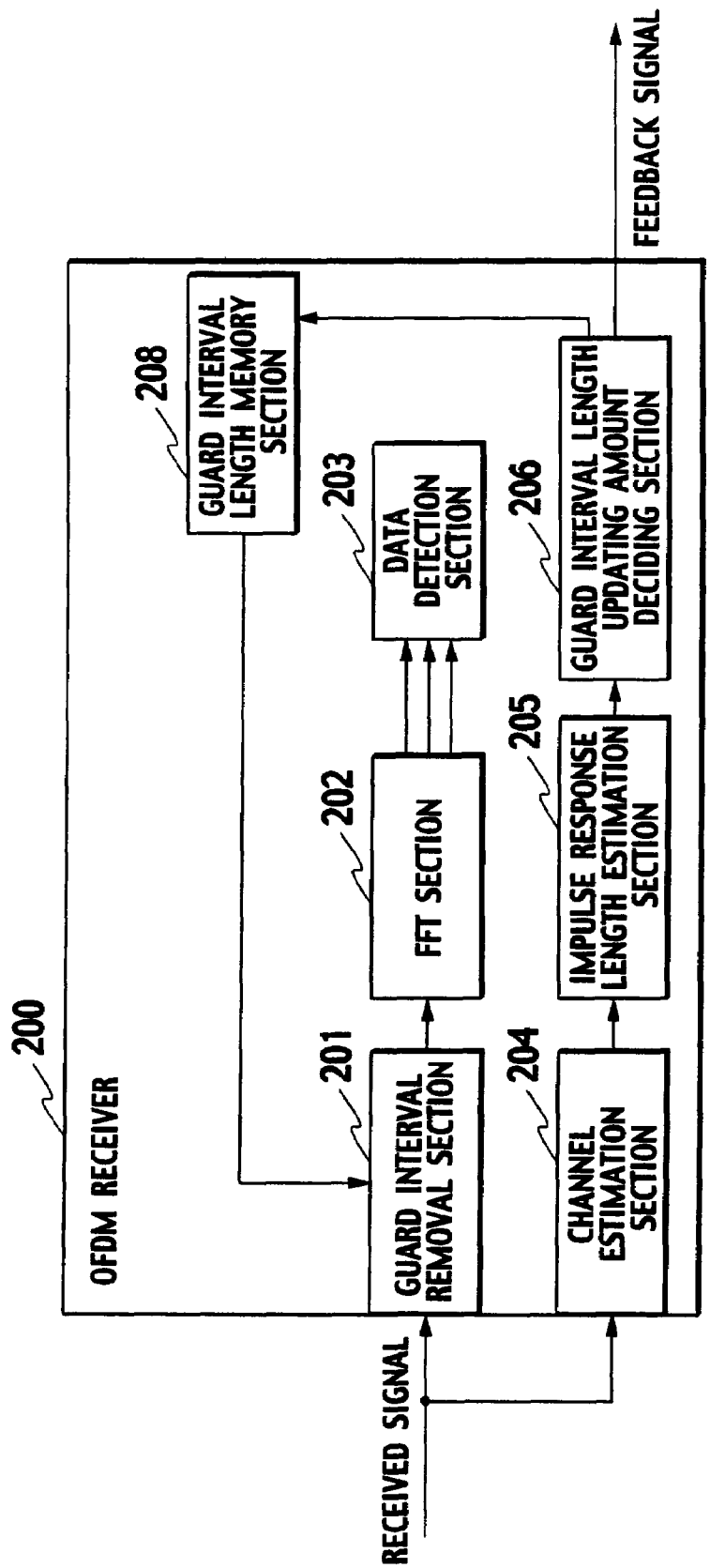
FIG. 4 is a functional block diagram of an OFDM receiver according to a prior art 2.
Figure 5:
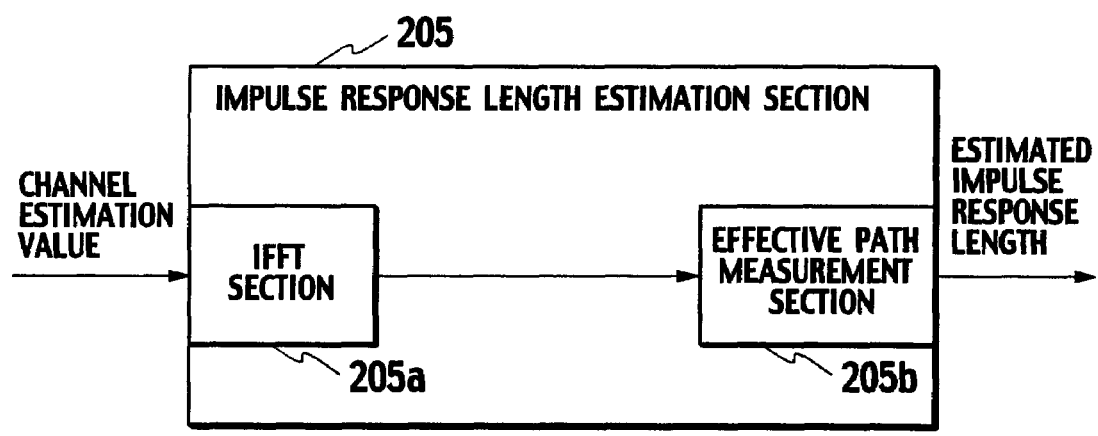
FIG. 5 is a functional block diagram of an impulse response length estimation section of the OFDM receiver according to the prior art 2.
Figure 7:
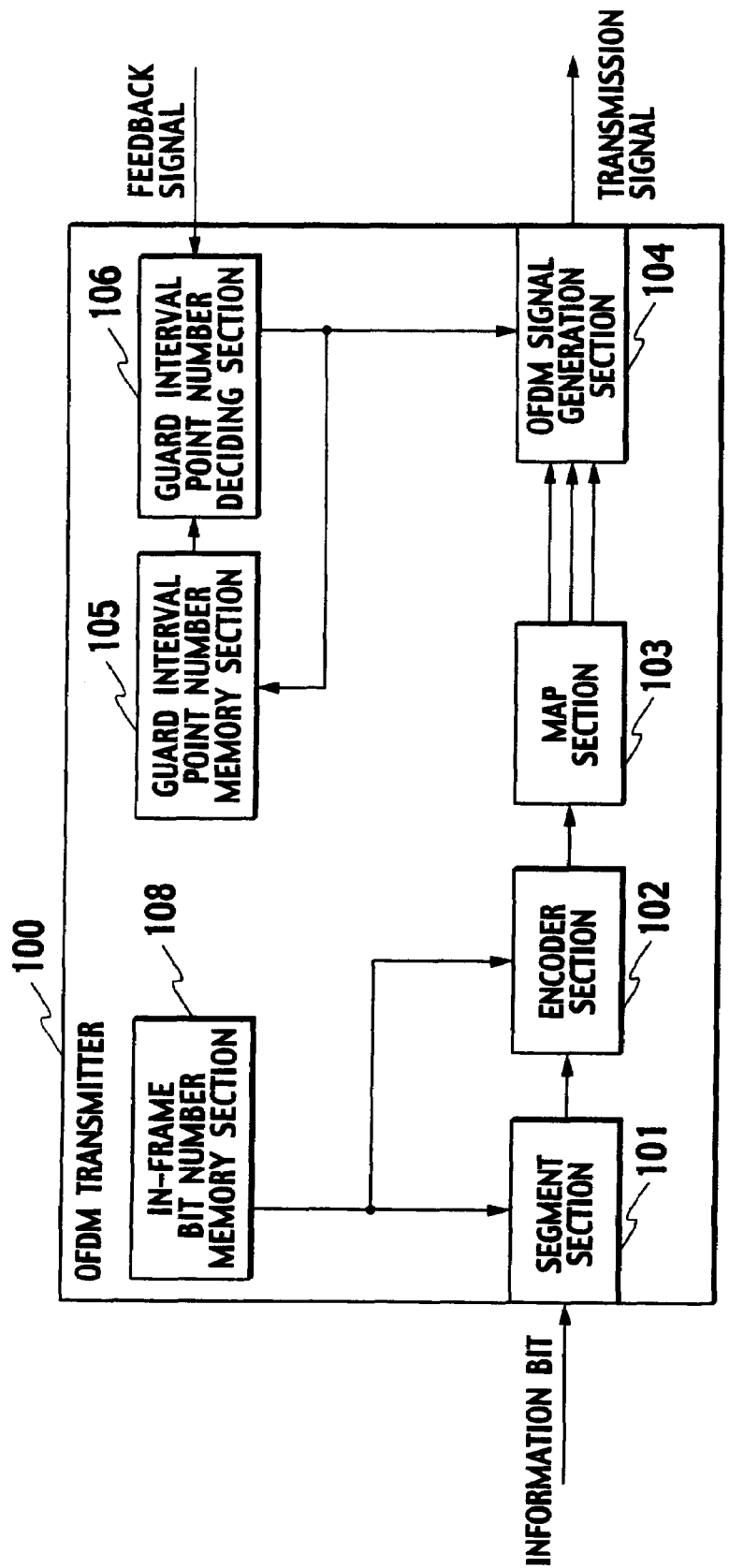
FIG. 7 is a functional bock diagram of an OFDM transmitter according to the prior art 2.
Figure 8:
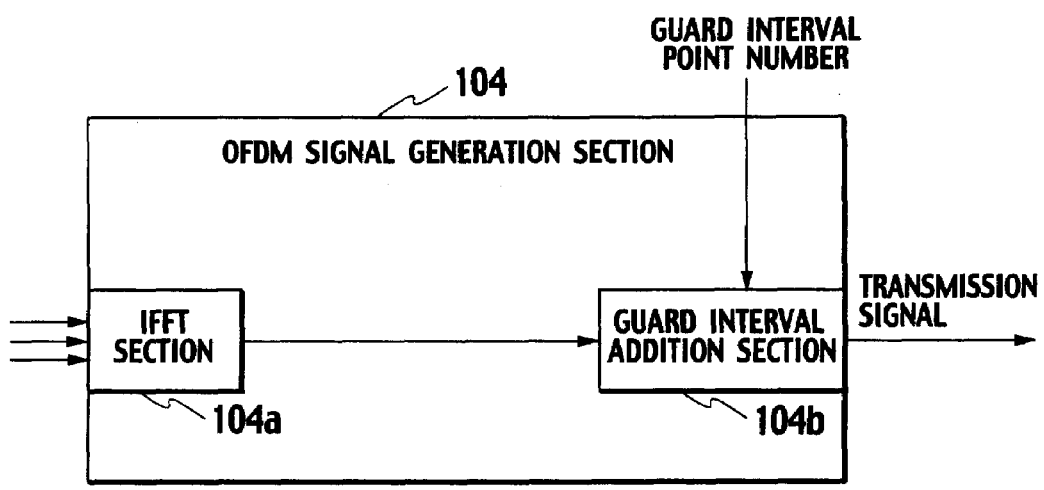
FIG. 8 is a functional block diagram of an OFDM signal generation section of the OFDM transmitter according to the prior art 2.

The conventional OFDM receiver 200 shown in FIG. 4 is used when an updating timing of the guard interval is known, and a current guard interval length is known beforehand. Thus, the conventional OFDM receiver 200 cannot estimate a guard interval length.

In reality, however, there are problems in that it is difficult to set a probability of errors in a feedback link to "0", and designing of a feedback link in which almost no errors occur needs a wide band.

Figure 18:
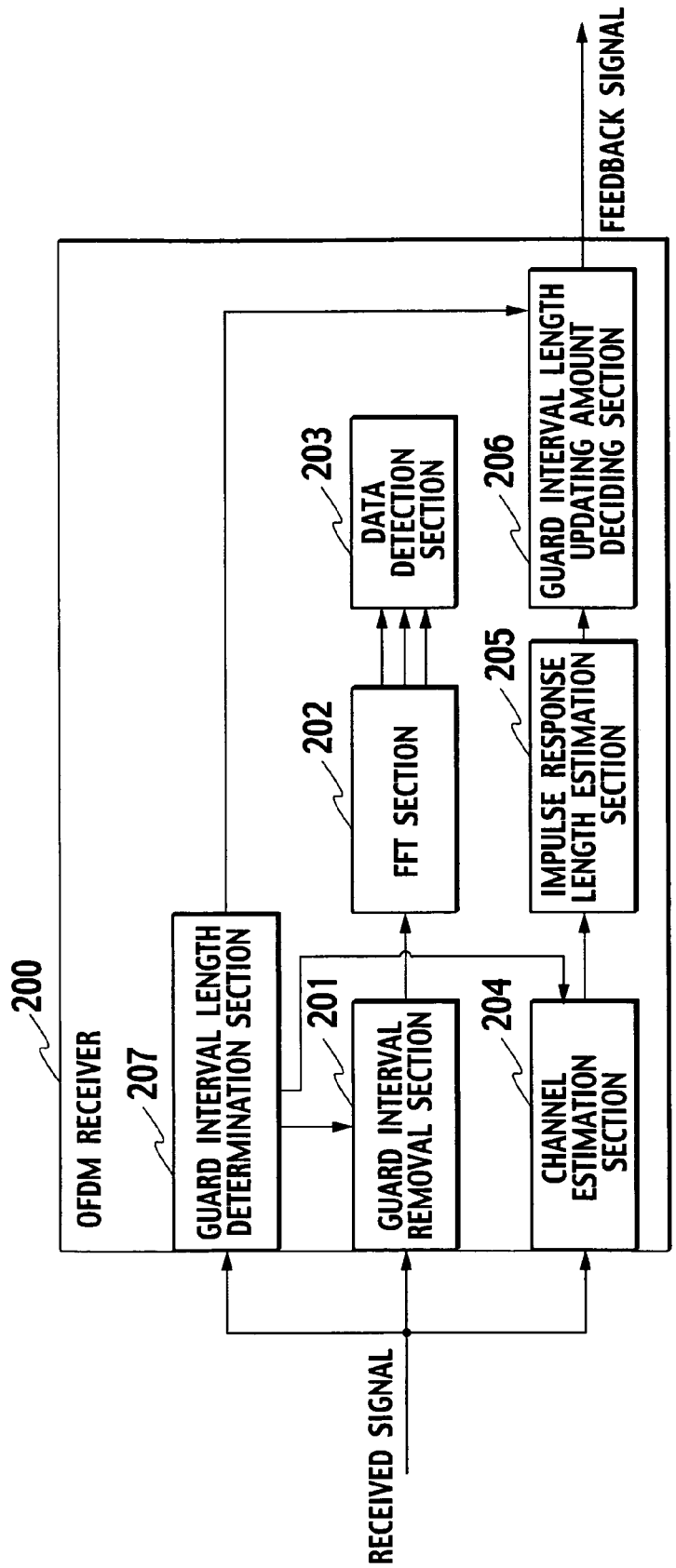
FIG. 18 is a functional block diagram of an OFDM receiver according to a fourth embodiment of the invention.

Therefore, the OFDM receiver 200 of the fourth embodiment is designed to solve the problems. To more specific, as shown in FIG. 18, the OFDM receiver 200 of the fourth embodiment includes a guard interval length determination section 207 configured to determine a guard interval length in each transmission symbol in a received frame by using self-correlation of a received signal, in addition to the components of the conventional OFDM receiver 200.

First, description is made of the guard interval length determination section 207 when a transmission symbol period is variable (adaptable to the OFDM transmitter 100 of the first embodiment).

Figure 19:
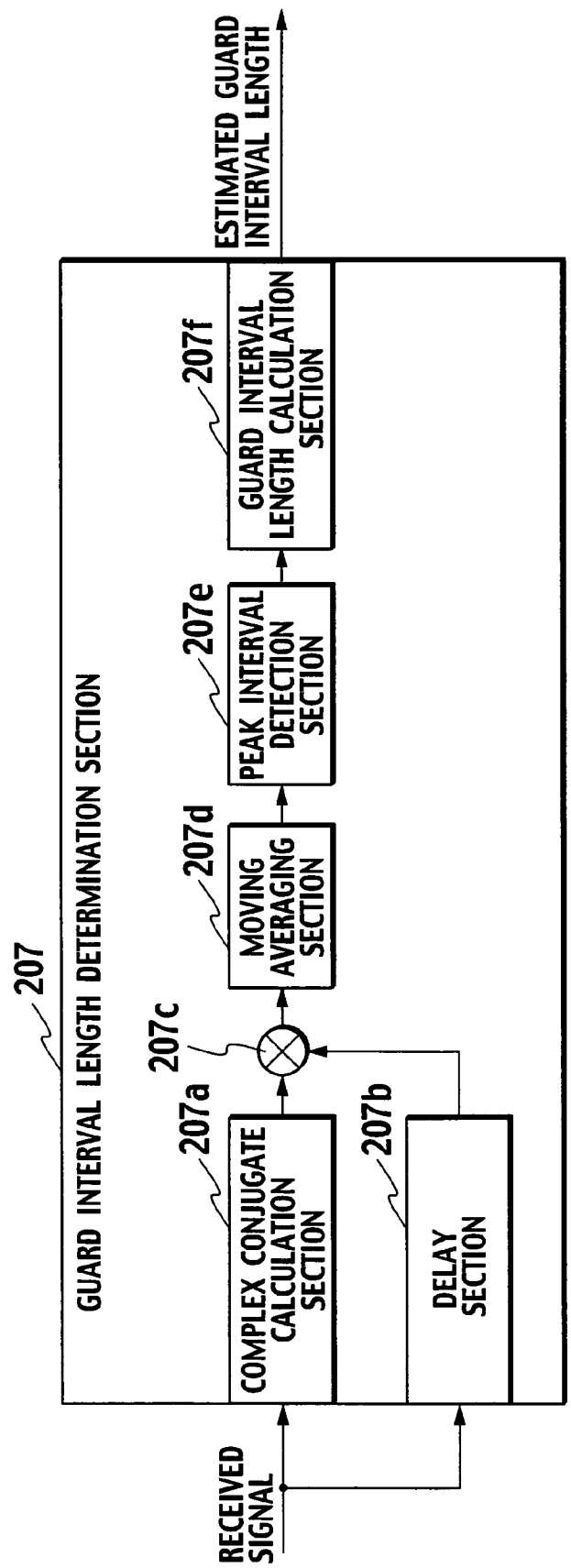
FIG. 19 is a functional block diagram of a first guard interval length determination section of the OFDM receiver according to the fourth embodiment of the invention.

In this case, as shown in FIG. 19, the guard interval length determination section 207 includes a complex conjugate calculation section 207a, a delay section 207b, a correlation section (multiplier section) 207c, a moving averaging section 207d, a peak interval detection section 207e, and a guard interval length calculation section 207f.

The guard interval length determination section 207 including such sections 207a to 207f is configured to determine a peak interval in the self-correlation of an OFDM signal as a guard interval length. Hereinafter, a specific method of determining a guard interval length is described.

The complex conjugate calculation section 207a is configured to calculate a complex conjugate of a received signal at a present time. The delay section 207b is configured to delay a received signal by one effective symbol period.

Figure 20:
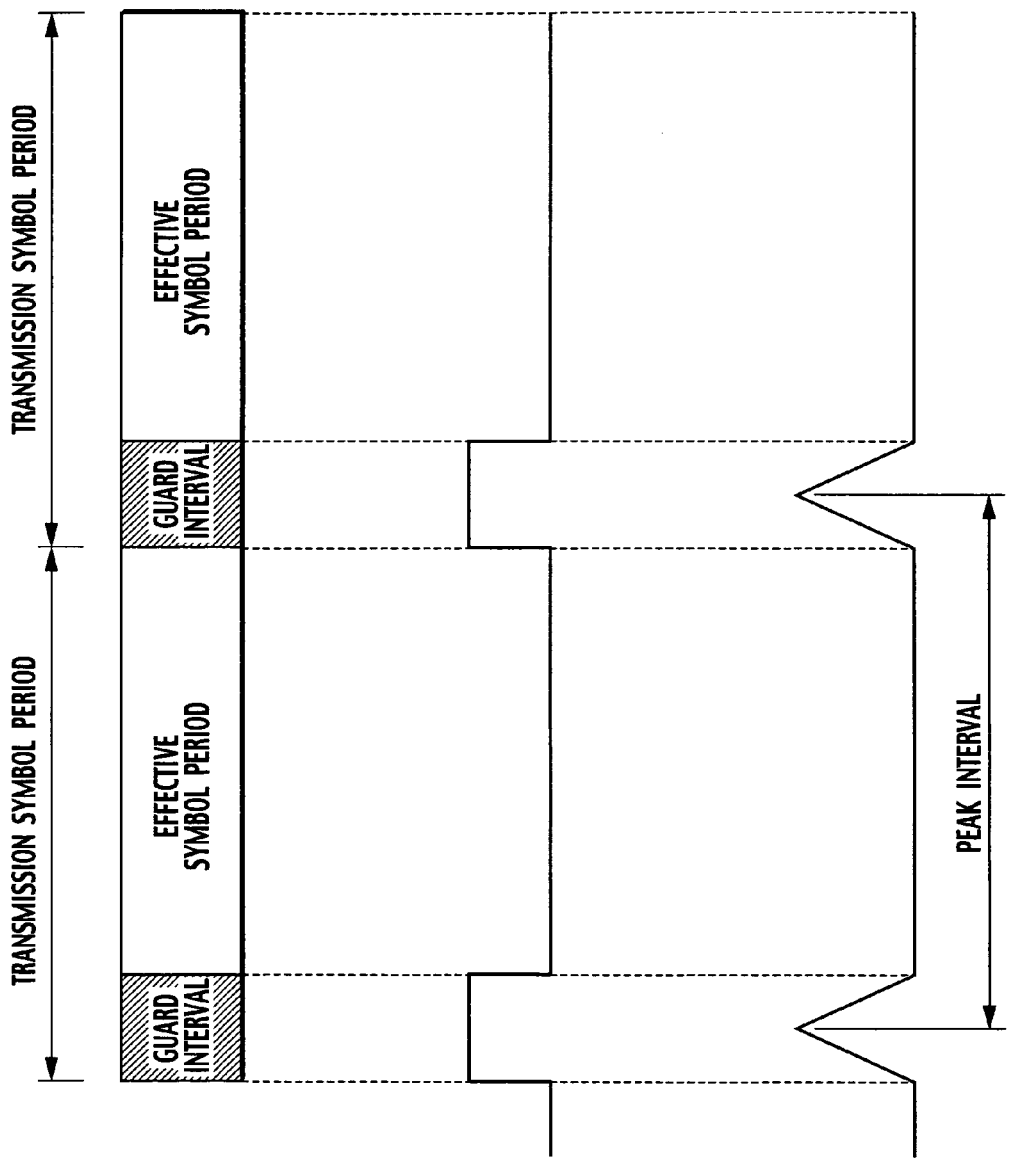
FIGS. 20A to 20C are diagrams illustrating a method of determining a guard interval length in the first guard interval length determination section of the OFDM transmitter according to the fourth embodiment of the invention.

As shown in FIGS. 20A to 20C, the correlation section 207c is configured to calculate a self-correlation of a received signal by two transmission symbol period units, by using the complex conjugate output from the complex conjugate calculation section 207a and a received signal output from the delay section 207b. FIG. 20B shows an example of a self-correlation of the received signal calculated by the correlation section 207c.

The moving averaging section 207d is configured to calculate a moving average of a guard interval regarding the self-correlation calculated by the correlation section 207c.

Here, since the guard interval length is variable, for example, a guard interval having a largest guard interval length is used for the calculation of the moving average.

FIG. 20C shows an example of a moving average of the self-correlation of the received signal calculated by the moving averaging section 207d.

The peak interval detection section 207e is configured to detect an interval of peaks are detected based on the moving average of the self-correlation of the received signal calculated by the moving averaging section 207d.

Here, the peak interval detected by the peak interval detection section 207e coincides with a transmission symbol period.

Accordingly, the guard interval length calculation section 207f is configured to output a result of subtracting an effective symbol period length from the peak interval detected by the peak interval detection section 207e, as an estimated guard interval length. Incidentally, the OFDM receiver 200 has known the effective symbol period length (fixed length).

Second, description is made of the guard interval length determination section 207 when a transmission symbol period is variable and an effective symbol period is fixed (adaptable to the OFDM transmitter 100 of the first embodiment).

Figure 21:
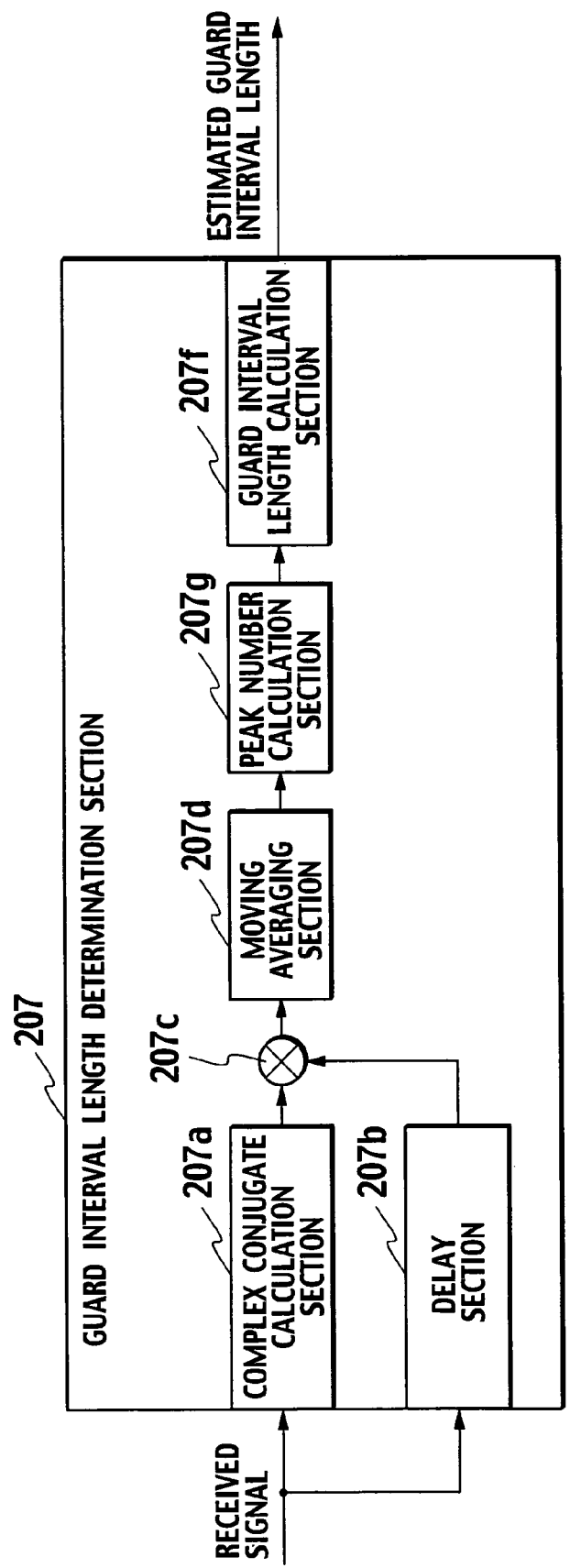
FIG. 21 is a functional block diagram of a second guard interval length determination section of the OFDM receiver according to the fourth embodiment of the invention.

In this case, as shown in FIG. 21, the guard interval length determination section 207 includes a complex conjugate calculation section 207a, a delay section 207b, a correlation section (multiplier section) 207c, a moving averaging section 207d, a peak number calculation section 207g, and a guard interval length calculation section 207f.

The guard interval length determination section 207 including such sections is configured to determine a guard interval length based on the number of peaks in the self-correlation of an OFDM signal calculated over one frame unit. Hereinafter, a specific method of determining a guard interval length is described.

The peak number calculation section 207g is configured to calculate the number of peaks detected in one frame based on the moving average of the self-correlation of the receive signal output from the moving averaging section 207d.

Figure 22:
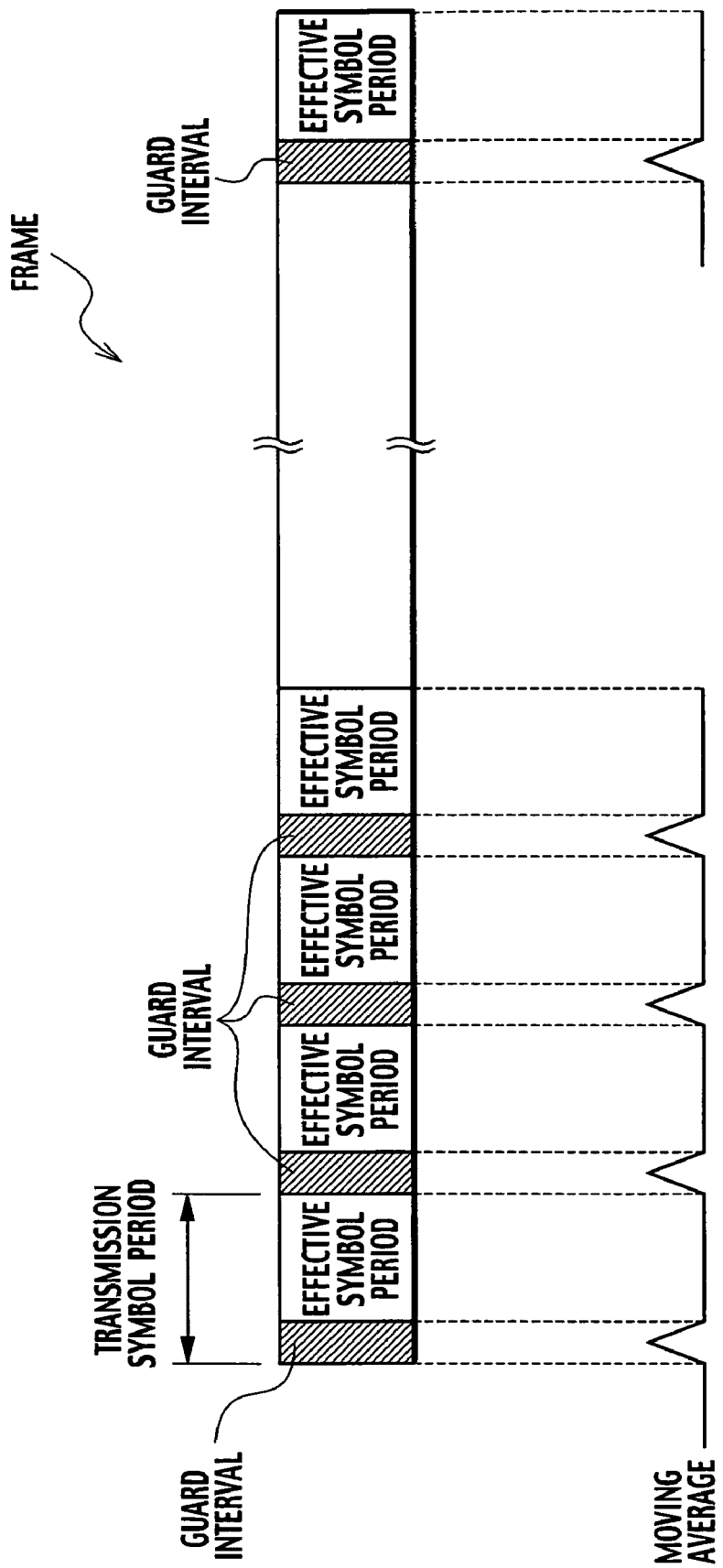
FIG. 22 is a diagram illustrating a method of determining a guard interval length in the second guard interval length determination section of the OFDM receiver according to the fourth embodiment of the invention.

As shown in FIG. 22, the number of peaks detected in one frame is equivalent to the number of transmission symbols in one frame. Thus, the guard interval length calculation section 207f can calculate an estimated guard interval length based on the following equations. Here, the OFDM receiver 200 is assumed to know the effective symbol period length (fixed length). (Transmission symbol period)=(frame length)/(peak number) (Estimated guard interval length)=(transmission symbol period)−(effective symbol period)

Third, description is made of the guard interval length determination section 207 when a transmission symbol period is fixed (adaptable to the OFDM transmitter 100 of the second embodiment).

The embodiment is described by way of case in which there are two kinds (D1 and D2) of DFT point numbers to be selected (effective symbol periods). However, the OFDM receiver 200 of the fourth embodiment can easily be expanded even when there are three or more kinds of DFT point numbers to be selected.

Figure 23:
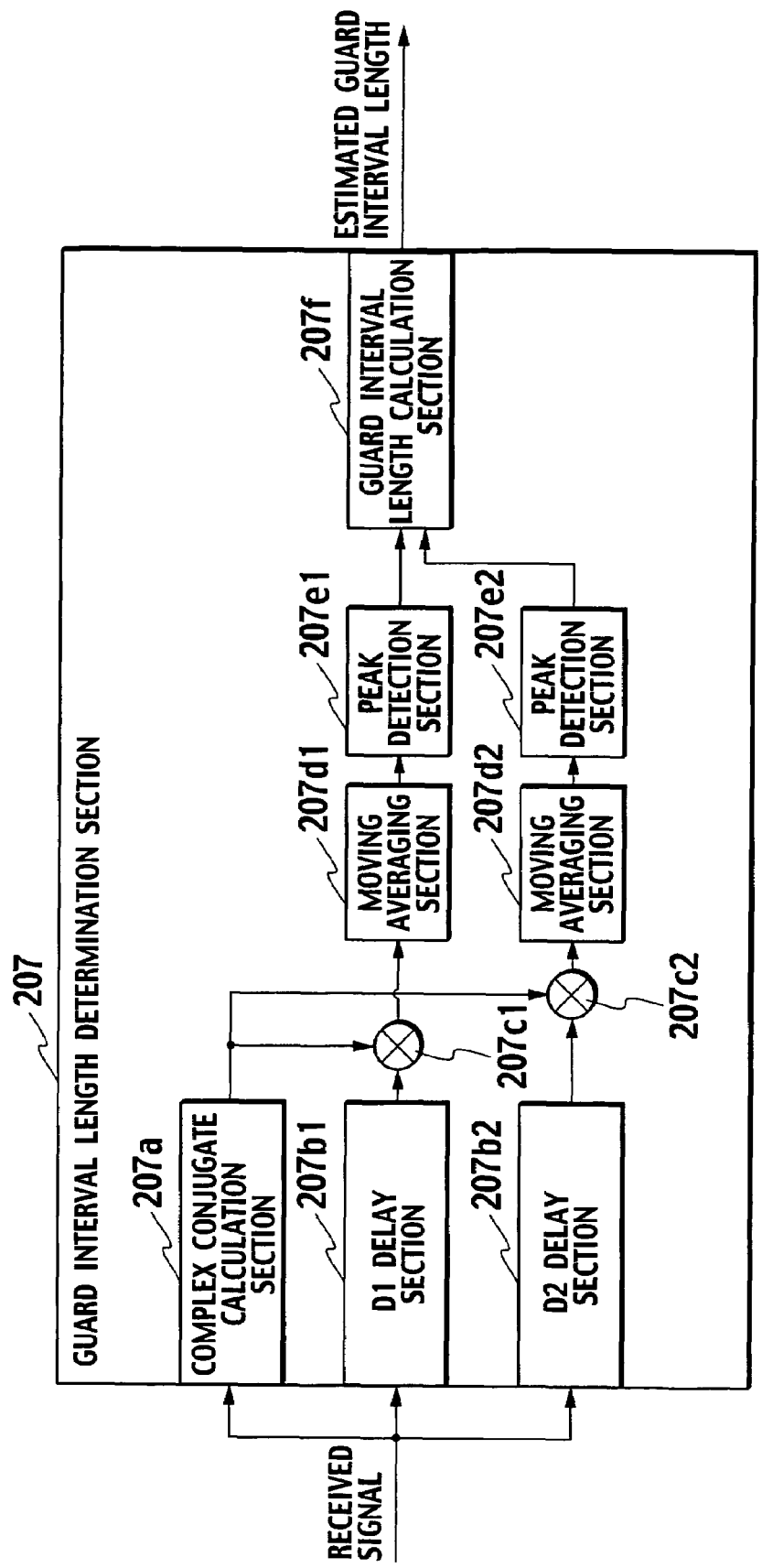
FIG. 23 is a functional block diagram of a third guard interval length determination section of the OFDM receiver according to the fourth embodiment of the invention.

In this case, as shown in FIG. 23, the guard interval length determination section 207 includes a complex conjugate calculation section 207a, a D1 delay section 207b1, a D2 delay section 207b2, a correlation section (multiplier section) 207c1, a correlation section (multiplier section) 207c2, a moving averaging section 207d1, a moving averaging section 207d2, a peak detection section 207e1, a peak detection section 207e2, and a guard interval length calculation section 207f.

The guard interval length determination section 207 including such sections is configured to calculate self-correlations of OFDM signals delayed by at least two kinds of delay amounts (D1, D2), to select a self-correlation with the largest peak value from among a plurality of calculated self-correlations of the OFDM signals, and to determine a peak interval length based on a delay amount corresponding to the selected self-correlation. Hereinafter, a specific method of determining a guard interval length is described.

The complex conjugate calculation section 207a is configured to calculate a complex conjugate of a received signal at a present time. The D1 delay section 207b1 is configured to delay the received signal by a D1 point, and the D2 delay section 207b2 is configured to delay the received signal by a D2 point.

The correlation section 207c1 is configured to calculate a self-correlation of a complex conjugate of a received signal output from the complex conjugate calculation section 207a and a received signal output from the D1 delay section 207b1, by one transmission symbol unit.

The correlation section 207c2 is configured to calculate a self-correlation of the complex conjugate of the received signal output from the complex conjugate calculation section 207a and a received signal output from the D2 delay section 207b2, by one transmission symbol unit.

The moving averaging section 207d1 is configured to calculate a moving average of the self-correlation calculated by the correlation section 207c1.

The moving averaging section 207d2 is configured to calculate a moving average of the self-correlation calculated by the correlation section 207c2.

The peak detection sections 207e1 and 207e2 are configured to detect peak values of the moving averages of the self-correlations calculated by the moving averaging sections 207d1 and 207d2, by one transmission symbol unit.

In this case, since a larger peak value is detected in the self-correlation calculated by using a delay which is equal to an effective symbol period used by the OFDM transmitter 100, the guard interval length calculation section 207f is configured to select a DFT point number according to inputs from the peak detection sections 207e1 and 207e2, and to output a result of subtracting the effective symbol period from a transmission symbol period of a fixed length, as an estimated guard interval length.

Figure 24:
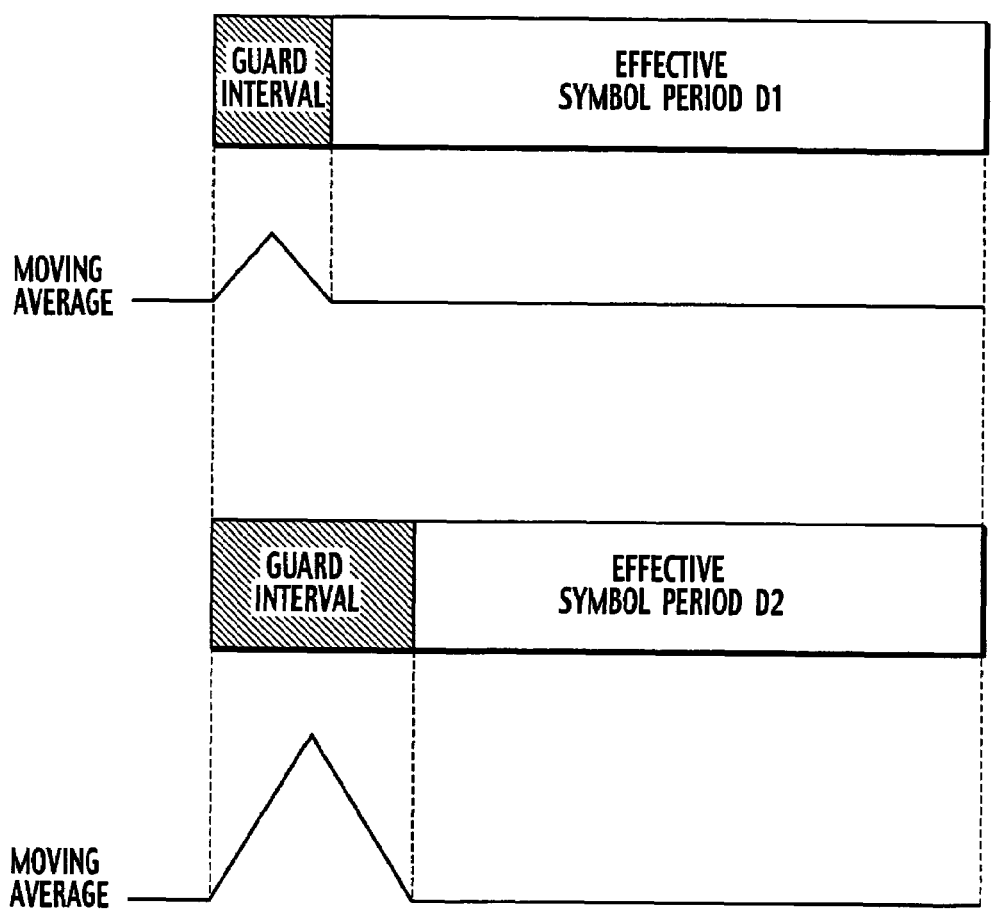
FIG. 24 is a diagram illustrating a method of determining a guard interval length in the third guard interval length determination section according to the fourth embodiment of the invention.

In an example of FIG. 24, since the peak value of the moving average output from the peak interval detection value 207e2 is larger than that of the moving average output from the peak interval detection section 207e1, the guard interval length calculation section 207f outputs a result of subtracting the effective symbol period D2 from the transmission symbol period length of the fixed length, as an estimated guard interval length.

Fourth, description is made of the guard interval length determination section 207 which is adaptable to the case that a transmission symbol period is variable.

Figure 25:
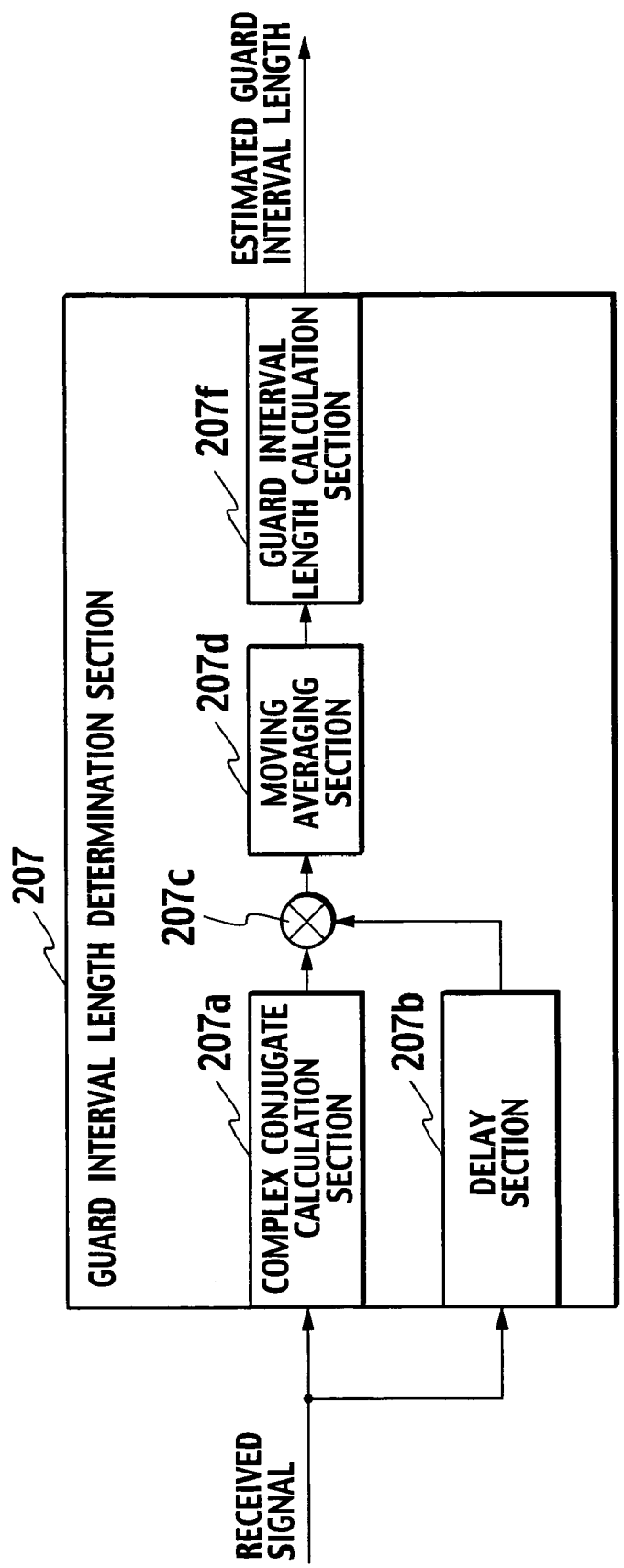
FIG. 25 is a functional block diagram of a fourth guard interval length determination section of the OFDM receiver according to the fourth embodiment of the invention.

In this case, as shown in FIG. 25, the guard interval length determination section 207 includes a complex conjugate calculation section 207a, a delay section 207b, a correlation section (multiplier section) 207c, a moving averaging section 207d, and a guard interval length calculation section 207f.

The guard interval length calculation section 207f thus disposed is configured to determine a period in which a moving average of a self-correlation of the OFDM signal is equal to or higher than a predetermined threshold value, as a guard interval length in one transmission symbol period. Hereinafter, a specific method of determining a guard interval length is described.

Figure 26:
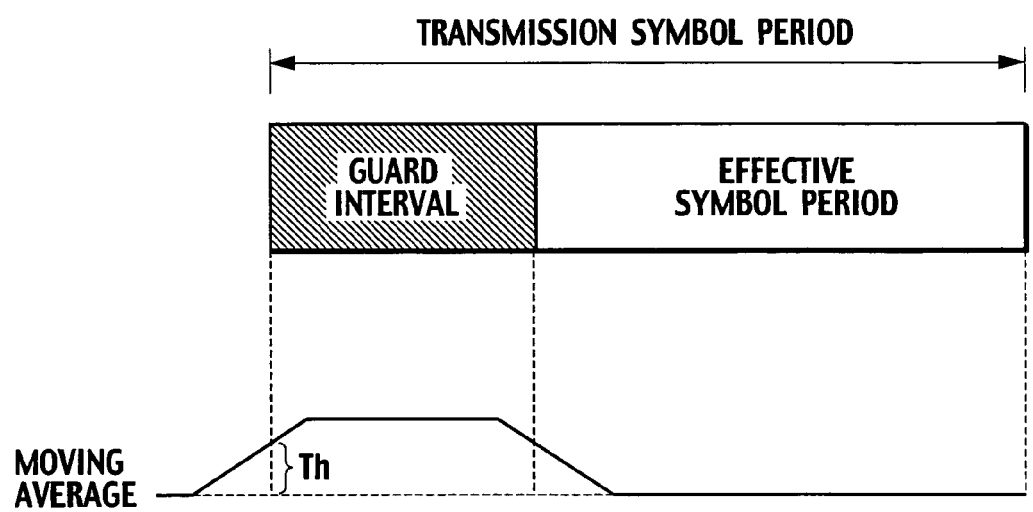
FIG. 26 is a diagram illustrating a method of determining a guard interval length in the fourth guard interval length determination section of the OFDM receiver according to the fourth embodiment of the invention.

The moving averaging section 207d is configured to calculate a moving average of a self-correlation of a received signal output from the correlation section 207e in a relatively short window. FIG. 26 shows an example of a moving average calculated by the moving averaging section 207d.

The guard interval length calculation section 207f is configured to calculate a period in which the moving average output from the moving averaging section 207d is equal to or higher than a predetermined threshold value Th, as an estimated guard interval length.

The fourth embodiment has been described by way of the method of estimating the guard interval length by using one transmission symbol or two transmission symbols only. However, the invention is not limited to these cases, and a guard interval length may be estimated by using three or more transmission symbols.

In the determination methods of the guard interval lengths except for the determination method of measuring the peak number, a guard interval length may be determined by averaging peak outputs or peak intervals obtained from a plurality of transmission symbols.

In the determination methods except for the determination method of measuring the peak interval, a moving average may not necessarily be taken.

Incidentally, by using the estimated guard interval length, the guard interval removal section 201 removes the guard interval from the received signal, and the channel estimation section 204 estimates a channel for the received signal.

According to the OFDM receiver 200 of the fourth embodiment, in the OFDM transmitter 200, even when the guard interval length cannot be known, it is possible to estimate a guard interval length in each transmission symbol period.

As described above, according to the present invention, by changing the guard interval length in each transmission symbol period without changing the frame length of the transmission signal, it is possible to provide the OFDM transmitter 100 and the OFDM receiver 200 which can realize the OFDM system of good receiving characteristics in various communication environments in a multi-user environment.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. An OFDM transmitter which transmits an OFDM signal by a frame having a plurality of transmission symbol periods constituted of an effective symbol period for transmitting an information bit and a guard interval, the OFDM transmitter comprising:
a guard interval length decider configured to decide a guard interval length in accordance with a feedback signal from an OFDM receiver; and
a guard interval length changer configured to change a guard interval length in each transmission symbol period, in accordance with a decided guard interval length without changing a frame length,
wherein the guard interval length changer comprises a predetermined time calculator configured to calculate a predetermined period necessary for maintaining the frame length constant, in accordance with a current guard interval length and an in-frame transmission symbol number.

2. The OFDM transmitter according to claim 1,
wherein the guard interval length changer comprises a selector configured to select the decided guard interval length having the calculated predetermined period added thereto, in one or a plurality of transmission symbol periods.

3. The OFDM transmitter according to claim 1,
wherein the guard interval length changer comprises:
a selector configured to select one of the decided guard interval length and the decided guard interval length having a predetermined period added thereto as a selected guard interval length, in each transmission symbol period; and
a guard interval adder configured to add a guard interval having the selected guard interval length to the effective symbol period, in each transmission symbol period.

4. The OFDM transmitter according to claim 1, wherein the guard interval length decider is configured to set the guard interval length in the transmission symbol period for transmitting a pilot symbol longer than that in the other transmission symbol period.

5. An OFDM transmitter which transmits an OFDM signal by a frame having a plurality of transmission symbol periods constituted of an effective symbol period for transmitting an information bit and a guard interval, the OFDM transmitter comprising:
a guard interval length decider configured to decide a guard interval length in accordance with a feedback signal from an OFDM receiver; and
a guard interval length changer configured to change a guard interval length in each transmission symbol period, in accordance with a decided guard interval length without changing a frame length,
wherein the guard interval length changer includes
a guard interval adder configured to add a guard interval having the decided guard interval length to the effective symbol period, in each transmission symbol period, and
a predetermined period adder configured to add a predetermined period for fixing a frame length in the frame.

6. An OFDM transmitter which transmits an OFDM signal by a frame having a plurality of transmission symbol periods constituted of an effective symbol period for transmitting an information bit and a guard interval, the OFDM transmitter comprising:
a guard interval length decider configured to decide a guard interval length in accordance with a feedback signal from an OFDM receiver; and
a guard interval length changer configured to change a guard interval length in each transmission symbol period, in accordance with a decided guard interval length without changing a frame length,
wherein the guard interval length changer includes
an Inverse Discrete Fourier transformer configure to execute IDFT processing for a symbol to which the information bit is mapped, by using a DFT point number calculated in accordance with the decided guard interval length, and a guard interval adder configured to add the guard interval having the decided guard interval length to the effective symbol period for transmitting the symbol subjected to the IDFT processing.

7. The OFDM transmitter according to claim 6, wherein the guard interval length changer is configured to change a ratio of the guard interval to the effective symbol period in each transmission symbol period, in accordance with the decided guard interval length.

* * * * *